United States Patent
Shiobara

[11] Patent Number: 5,535,214
[45] Date of Patent: Jul. 9, 1996

[54] TIMELY PROCESSING OF TRANSMISSION AND RECEPTION REQUESTS IN A MULTI-NODE COMMUNICATION NETWORK

[75] Inventor: Yasuhisa Shiobara, Tokyo, Japan

[73] Assignee: Kabushiki Kaisha Toshiba, Kawasaki, Japan

[21] Appl. No.: 60,041

[22] Filed: May 13, 1993

[30] Foreign Application Priority Data

Jun. 18, 1992 [JP] Japan ................................ 4-159725

[51] Int. Cl.⁶ ............................................. H04L 12/433
[52] U.S. Cl. ................. 370/85.6; 370/85.5; 340/825.5
[58] Field of Search ................ 370/60, 60.1, 85.1, 370/85.2, 85.4, 85.5, 85.6, 85.15, 94.1, 94.2, 94.3, 95.1; 340/825.05, 825.5, 825.51

[56] References Cited

U.S. PATENT DOCUMENTS

| | | | |
|---|---|---|---|
| 4,404,557 | 9/1983 | Grow | 340/825.05 |
| 5,065,397 | 11/1991 | Shiobara | 370/85.12 |
| 5,079,763 | 1/1992 | Chao et al. | 370/85.15 |
| 5,119,374 | 6/1992 | Firoozmand et al. | 370/85.6 |
| 5,140,584 | 8/1992 | Suzuki | 370/94.1 |
| 5,172,373 | 12/1992 | Suzuki | 370/85.6 |

FOREIGN PATENT DOCUMENTS

| | | |
|---|---|---|
| 0147677 | 7/1985 | European Pat. Off. . |
| 0185332 | 6/1986 | European Pat. Off. . |

*Primary Examiner*—Hassan Kizou
*Attorney, Agent, or Firm*—Cushman Darby & Cushman

[57] ABSTRACT

Each node in a network of nodes calculates and holds a data transmission processing time of each node, a transfer time of data and a reception processing time of the data on the basis of past data transmission/reception information. A transmission request sequence for a plurality of data in a first node is rearranged responsive to a transmission request for specific data from a first node to a second node. This rearranging process is done on the basis of a difference between a request timing at which time the specific data is required by the second node and the sum of: 1) a reception processing time of the second node, the reception processing time being held in the first transmission reception node; 2) a transfer time required for transferring data from the first node to the second node, the transfer time being held in the first node; and 3) a current timing, thereby determining a transmission processing sequence. Transmission processing is performed in accordance with the determined transmission processing sequence. Not only may data be ordered within each node with regard to both transmission and reception, but also data may be ordered for transmission throughout the entire network.

35 Claims, 19 Drawing Sheets

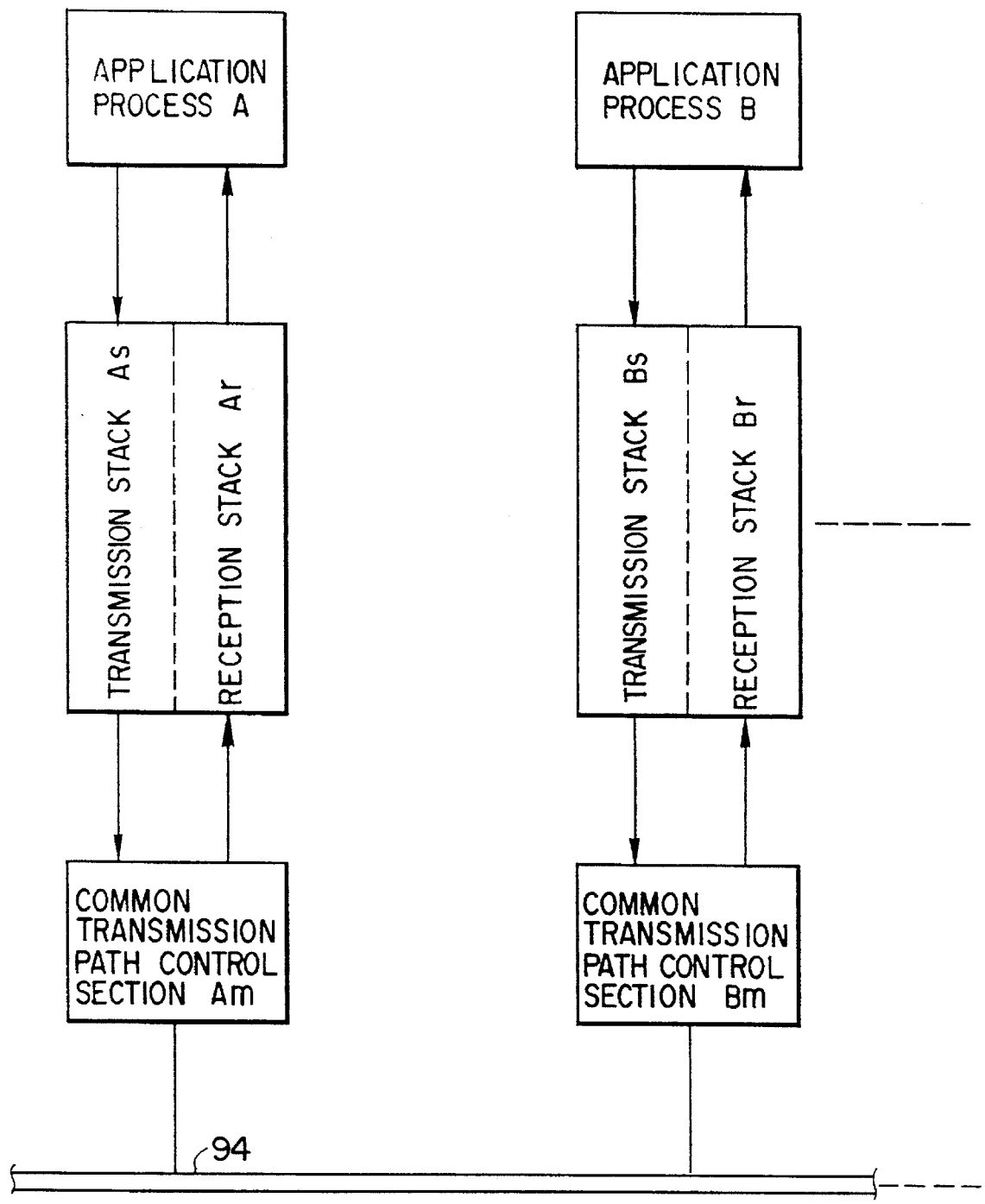
F I G. 1

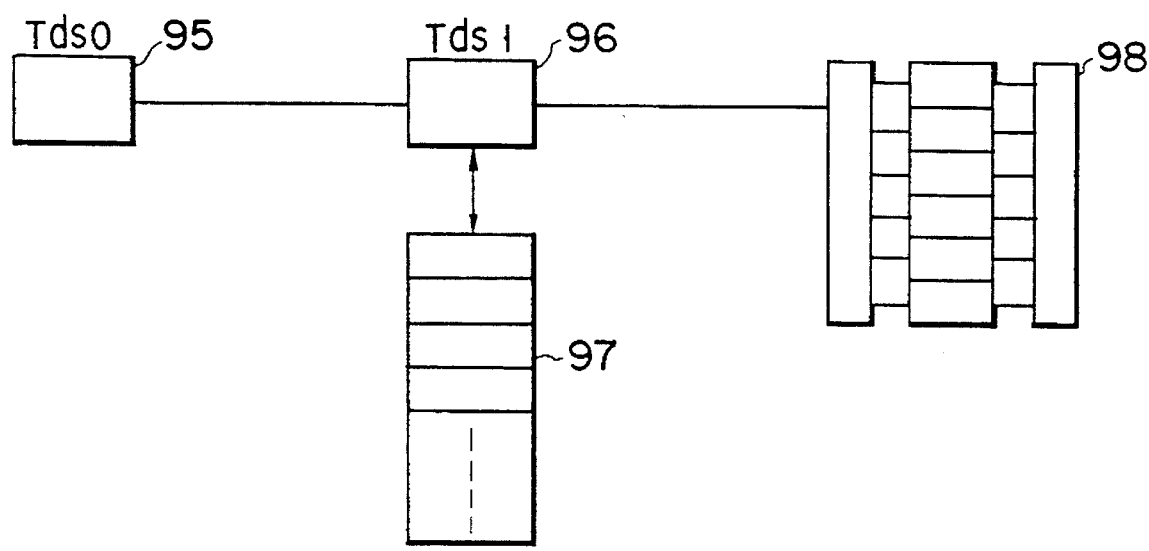
F I G. 2

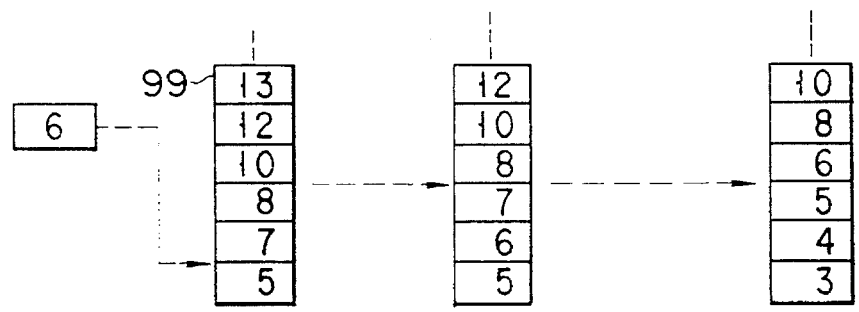
F I G. 3
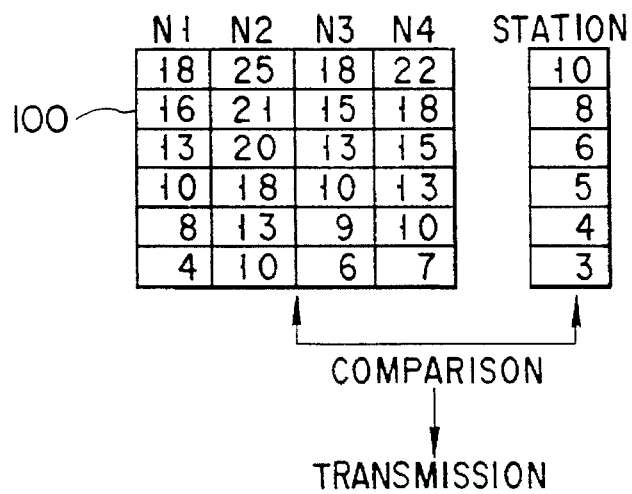
F I G. 4
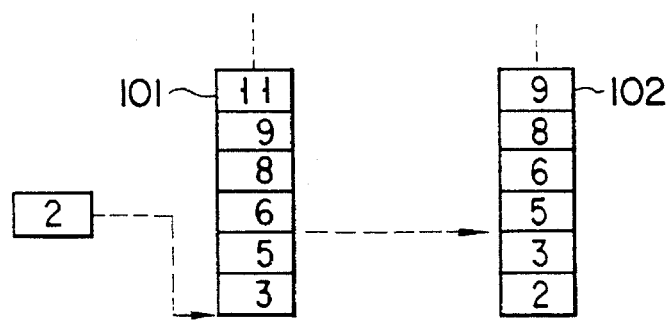
F I G. 5

| TRANSMISSION DATA BUFFER/CHAIN CONTROL AREA |
|---|
| START/INTERMEDIATE/END DISPLAY AREAS OF TRANSMISSION DATA |
| INTRA-BUFFER INFORMATION PORTION DATA COUNT FOR TRANSMISSION DATA |
| INFORMATION PORTION (K) OF TRANSMISSION DATA DT1(j) |

FIG. 9

| CONTROL BLOCK CB1 BUFFER/CHAIN CONTROL AREA |
|---|
| DATA FRAME ID CODE |
| DESTINATION ADDRESS |
| FREE AREA |
| TRANSMISSION COMMAND |
| REQUEST TIMING (=TO(j)) |
| MARGIN TIME (=Tds(j)) |
| ELAPSED TIME INFORMATION AREA (=TIM1(j)) |
| TRANSMISSION DATA DT1(j) STORAGE POINTER VALUE |
| TOTAL DATA COUNT CONTROL AREA OF TRANSMISSION DATA DT1(j) (=CNT1(j)) |

FIG. 10

[PREAMBLE] [START DELIMITER] [FRAME CONTROL=DATA FRAME]
[DESTINATION ADDRESS] [SOURCE ADDRESS]
[INFORMATION PORTION:INCLUDING REQUEST TIMING (TO(j)) VALUE]
[FCS:FRAME CHECK SEQUENCE] [END DELIMITER]

FIG. 11

| TRANSMISSION CONTROL BLOCK/CHAIN CONTROL AREA |
|---|
| IMMEDIATELY PRECEDING TCB1(j) STORAGE POINTER VALUE (PRE) |
| SUCCEEDING TCB1(j) STORAGE POINTER VALUE (NEXT) |
| TRANSMISSION/TRANSMISSION COMPLETION DISPLAY (TSTATUS) |
| DATA FRAME HEADER INFORMATION PORTION STORAGE POINTER VALUE (=CB1(j) STORAGE ADDRESS) |
| DATA FRAME INFORMATION PORTION STORAGE POINTER VALUE (=DT1(j) BUFFER START STORAGE ADDRESS) |

FIG. 12

| STORAGE POINTER VALUE OF TRANSMISSION FRAME CONTROL BLOCK TCB1(j) INDICATING HIGHEST URGENCY |
|---|
| TOTAL NUMBER OF LINKED CONTROL BLOCKS TCB1 |

FIG. 13

| STORAGE POINTER VALUE OF FIRST TRANSMISSION FRAME CONTROL BLOCK TCB1 |
|---|
| STORAGE POINTER VALUE OF LAST TRANSMISSION FRAME CONTROL BLOCK TCB1 |
| TOTAL NUMBER OF LINKED CONTROL BLOCKS TCB1 |

FIG. 14

| | |
|---|---|
| FIRST STATION TRANSMISSION/RECEPTION PROCESSING TIME INFORMATION | |
| FIRST STATION TRANSMISSION PROCESSING TIME (Tx) | MAXIMUM VALUE |
| DITTO | MINIMUM VALUE |
| FIRST STATION RECEPTION PROCESSING TIME (Tr) | MAXIMUM VALUE |
| DITTO | MINIMUM VALUE |
| TRANSFER TIME FROM FIRST STATION TO SECOND STATION (Txf) | MAXIMUM VALUE = 0 |
| DITTO | MINIMUM VALUE = 0 |
| TRANSFER TIME FROM FIRST STATION TO THIRD STATION | MAXIMUM VALUE |
| DITTO | MINIMUM VALUE |
| | |
| TRANSFER TIME FROM FIRST STATION TO nTH STATION | MAXIMUM VALUE |
| DITTO | MINIMUM VALUE |
| SECOND STATION TRANSMISSION/RECEPTION PROCESSING TIME INFORMATION | |
| nTH STATION TRANSMISSION/RECEPTION PROCESSING TIME INFORMATION | |
| nTH STATION TRANSMISSION PROCESSING TIME (Tx) | MAXIMUM VALUE |
| DITTO | MINIMUM VALUE |
| nTH STATION RECEPTION PROCESSING TIME (Tr) | MAXIMUM VALUE |
| DITTO | MINIMUM VALUE |
| TRANSFER TIME FROM nTH STATION TO FIRST STATION (Txf) | MAXIMUM VALUE |
| DITTO | MINIMUM VALUE |
| TRANSFER TIME FROM nTH STATION TO SECOND STATION | MAXIMUM VALUE |
| DITTO | MINIMUM VALUE |
| | |

F I G. 15

| RECEPTION FRAME CONTROL BLOCK/CHAIN CONTROL AREA |
|---|
| IMMEDIATELY PRECEDING RCB1(j) STORAGE POINTER VALUE (PRE) |
| SUCCEEDING RCB1(j) STORAGE POINTER VALUE (NEXT) |
| TRANSMISSION/RECEPTION COMPLETION DISPLAY (RSTATUS) |
| DATA FRAME STORAGE POINTER VALUE |
| ELAPSED TIME INFORMATION AREA |
| MARGIN TIME AREA (Tds) |

F I G. 16

| STORAGE POINTER VALUE OF RECEPTION FRAME CONTROL BLOCK RCB1(j) INDICATING HIGHEST URGENCY |
|---|
| TOTAL NUMBER OF LINKED CONTROL BLOCKS RCB1 |

F I G. 17

| STORAGE POINTER VALUE OF FIRST RECEPTION FRAME CONTROL BLOCK RCB1 |
|---|
| STORAGE POINTER VALUE OF LAST RECEPTION FRAME CONTROL BLOCK RCB1 |
| TOTAL NUMBER OF LINKED CONTROL BLOCKS RCB1 |

F I G. 18

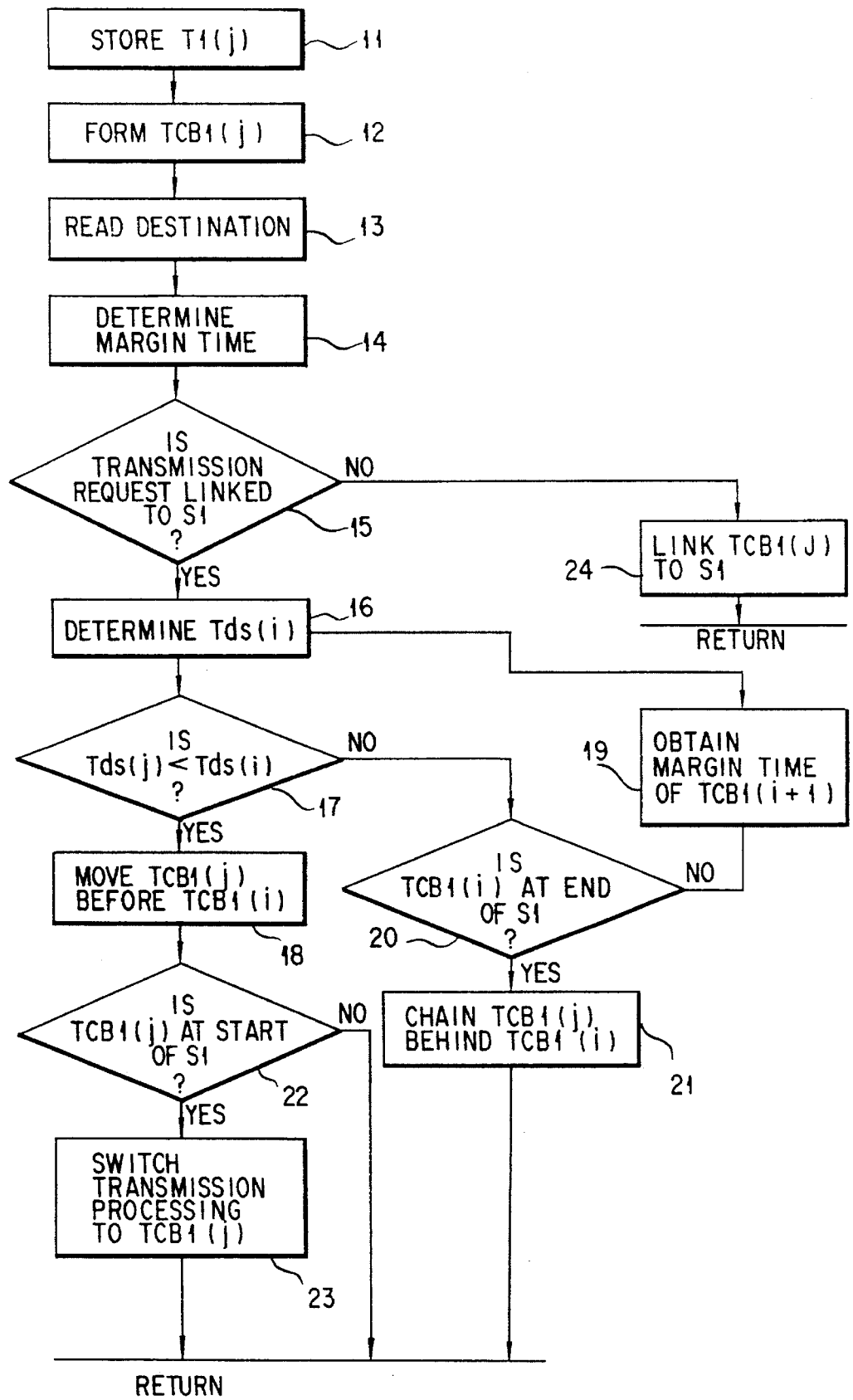
F I G. 19

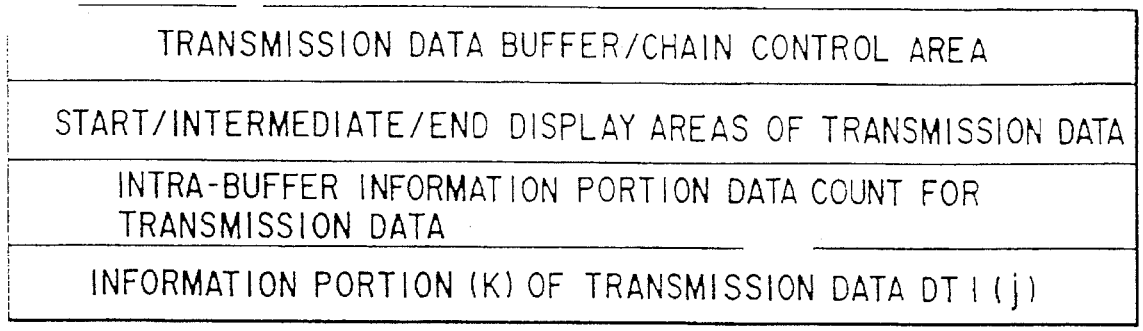
F I G. 26
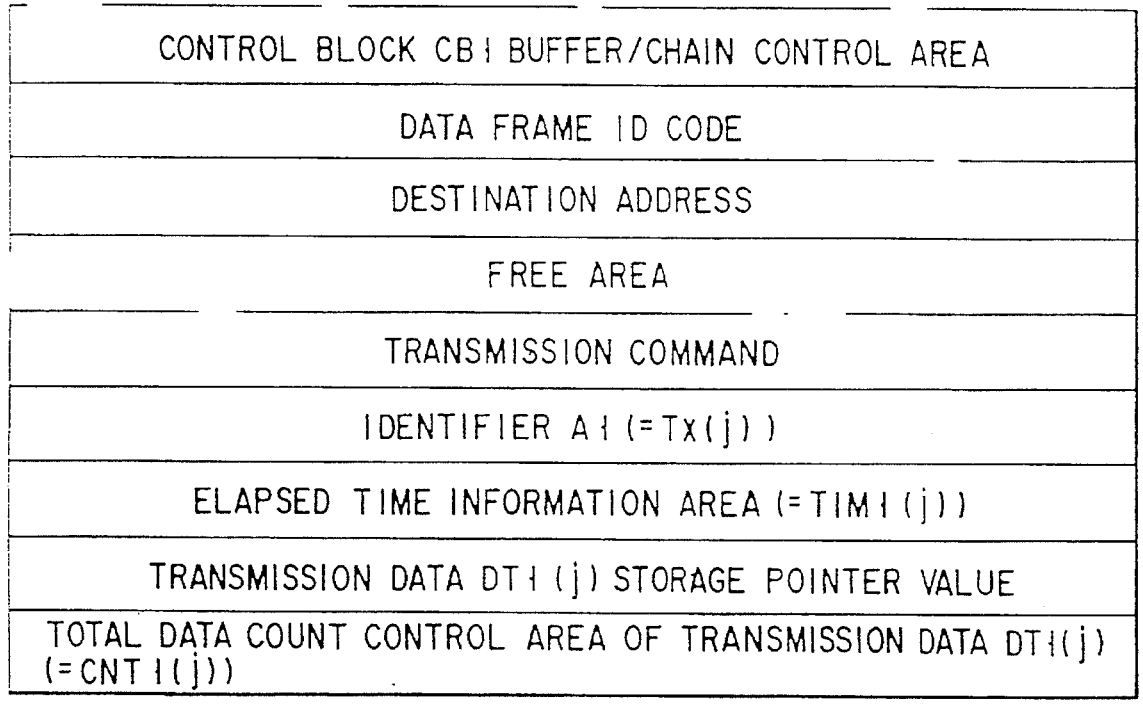
F I G. 27
[PREAMBLE] [START DELIMITER] [FRAME CONTROL=DATA FRAME]
[DESTINATION ADDRESS] [SOURCE ADDRESS] [INFORMATION PORTION]
[FCS:FRAME CHECK SEQUENCE] [END DELIMITER]
F I G. 28

| TRANSMISSION FRAME CONTROL BLOCK/CHAIN CONTROL AREA |
|---|
| DATA FRAME HEADER INFORMATION PORTION STORAGE POINTER VALUE (=CB1(j) STORAGE ADDRESS) |
| DATA FRAME INFORMATION PORTION STORAGE POINTER VALUE (=DT1(j) BUFFER START STORAGE ADDRESS) |

F I G. 29

| PRECEDING R1(j) STRAGE POINTER VALUE (PRE) |
|---|
| SUCCEEDING R1(j) STORAGE POINTER VALUE (NEXT) |
| CB1(j) STORAGE POINTER VALUE |

F I G. 30

| TRANSMISSION REQUEST R1(j) STORAGE POINTER INDICATING HIGHEST URGENCY |
|---|
| TOTAL NUMBER OF LINKED TRANSMISSION REQUESTS R1 |
| STORAGE POINTER VALUE (NEXTP) OF TRANSMISSION REQUEST R1(j) TO BE FORMED NEXT TO IDENTIFIER A2 WHICH HAS BEEN FORMED |

F I G. 31

| |
|---|
| FREE AREA |
| MEDIA ACCESS REQUEST FRAME ID CODE |
| DESTINATION ADDRESS (=BROADCAST ADDRESS) |
| SELF-STATION ADDRESS |
| TRANSMISSION COMMAND |
| FREE AREA |
| IDENTIFIER A2 START STORAGE POINTER VALUE (=ADR 22) |
| NUMBER (=N) OF TRANSMISSION REQUESTS INCLUDED IN IDENTIFIER A2 |
| IDENTIFIER A1 VALUE CORRESPONDING TO ABSENCE OF TRANSMISSION REQUEST |

F I G. 32

| |
|---|
| TRANSMISSION DATA BUFFER/CHAIN CONTROL AREA |
| START/INTERMEDIATE/END DISPLAY OF TRANSMISSION DATA |
| TRANSMISSION BUFFER INTRA-BUFFER INFORMATION PORTION DATA COUNT (=1) |
| TO (j) VALUE=TN CORRESPONDING TO TRANSMISSION REQUEST HAVING NTH URGENCY |
| FREE AREA |

F I G. 33

[PREAMBLE] [START DELIMITER]
[FRAME CONTROL=MEDIA ACCESS REQUEST]
[DESTINATION ADDRESS] [SOURCE ADDRESS]
[INFORMATION PORTION INCLUDING IDENTIFIER A2]
[FCS:FRAME CHECK SEQUENCE] [END DELIMITER]

F I G. 34

| TRANSMISSION FRAME CONTROL BLOCK/CHAIN CONTROL AREA |
|---|
| HEADER INFORMATION STORAGE POINTER VALUE (=ADR 21) |
| INFORMATION PORTION STORAGE POINTER VALUE (=ADR 22) |

F I G. 35

| IMMEDIATELY PRECEDING R2 (j) STORAGE POINTER VALUE (PRE) |
|---|
| SUCCEEDING R2 (j) STORAGE POINTER VALUE (NEXT) |
| FREE AREA |
| TRANSMISSION CONTROL STATION ADDRESS IN REQUESTING STATE |
| PRIORITY K OF URGENCY IN TRANSMISSION CONTROL STATION |
| IDENTIFIER A1 VALUE (=TK) CORRESPONDING TO URGENCY PRIORITY K |

F I G. 36

| |
|---|
| TRANSMISSION REQUEST R2 (j) STORAGE POINTER VALUE INDICATING HIGHEST URGENCY |
| TOTAL NUMBER OF LINKED TRANSMISSION REQUESTS R2 |
F I G. 37
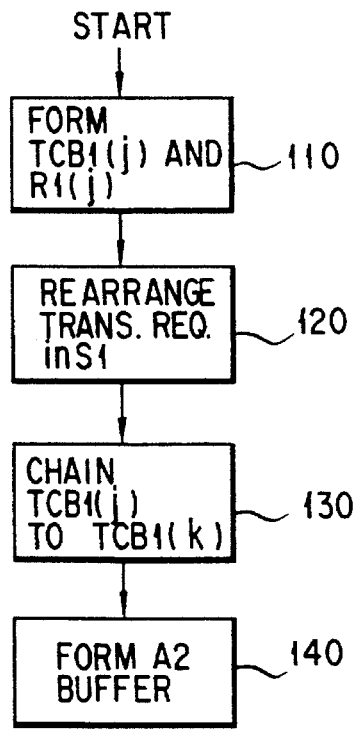
F I G. 38
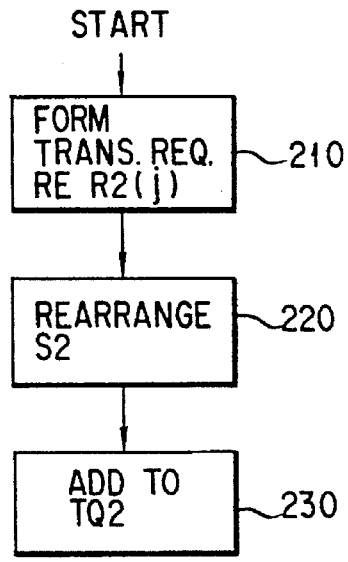
F I G. 39
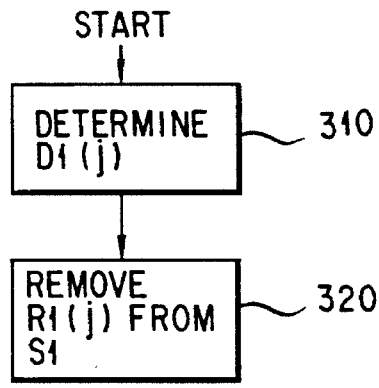
F I G. 40

TIMELY PROCESSING OF TRANSMISSION AND RECEPTION REQUESTS IN A MULTI-NODE COMMUNICATION NETWORK

BACKGROUND OF THE INVENTION

1. Field of the Invention

The present invention relates to a data transmission method and apparatus.

2. Description of the Related Art

As the power of local processors increases, local area network (LAN) technology has been utilized to interconnect such processors in extremely powerful networks. LANs have been employed to pass information within an office or to control automated factories.

When data must be supplied in a timely manner, a token passing scheme has commonly been employed within the LAN. In this scheme, each transmission control station acquires a transmission right within a predictable predetermined period of time to be allowed to perform data transmission.

The token passing LAN has commonly been implemented either as a bus type LAN defined by ISO 88024 or IEEE 802.4 standard or a ring type LAN defined by ISO 9314 or ANSI X3T9.5 standard.

In the token passing scheme, a frame called a token is transmitted/received among nodes so that a transmission right is sequentially transferred to the respective nodes. That is, a plurality of nodes do not acquire the transmission right at the same time. Upon receiving the token, a given node transmits data within a preset period of time. Therefore, each node can calculate the maximum time it will have to wait until its station can transmit data on the basis of the total number of nodes and a preset wait time of each node. Every node can transmit data without fail according to a transmission sequence. As a result, deterministic media access control can be performed.

Each node stores the address of a succeeding node (succeeding station) to which its station is to transfer the token, and the address of a preceding node (preceding station) from which the token has been transferred to its station. The token is sequentially transferred to the respective nodes as if the nodes were connected to each other, thus forming a logical ring. Therefore, in the token passing scheme, various types of LAN configurations such as bus, ring and star network configurations can be employed.

Furthermore, the token passing scheme has a priority processing function of assigning data (to be transmitted) to normally four types of access classes according to their transmission priorities, designated access classes 6, 4, 2, and 0. Access class 6 has the highest priority, and the priorities of access classes 4, 2, and 0 decrease in this order. Data waiting for transmission can be classified into four types of queues. Transmission of access class 6 data can be performed at any time within a token holding time defined by the token passing protocol. That is, class 6 data can be transmitted any time a node has the token. Transmission of access classes 4, 2, and 0 data can be performed during a time interval between the instant at which a token is received and the instant at which the target token rotation timer of each access class has elapsed. When the token is received by each class within a node, the target token rotation timer for that class begins measuring the length of time until the token returns. The target token rotation timer elapses when a maximum period of time has passed for the token to make a complete circuit of the ring. That is, each target token rotation time value is determined on the basis of the time it takes for the token to rotate through the logical ring.

More specifically, when a given node receives the token, a queue with access class 6 is serviced and corresponding data is transmitted. If no data needs to be transmitted or all class 6 data has been transmitted and the token holding time has not expired, the token is transferred to a lower access class within the node. At lower access classes 4, 2, or 0, if the token returns within the target token rotation time for that class, data with a corresponding access class can be transmitted until the corresponding target token rotation time elapses. If the token returns after the target token rotation time has elapsed, data with a corresponding access class cannot be transmitted even if the token is received.

In this case, the token is transferred to a lower access class or a succeeding node. More specifically, each access class operates like a virtual sub-station in each node. After the token is passed among all the access classes in each node, from the access class having the highest priority to the access class having the lowest priority, it is transferred to a succeeding station.

An algorithm for servicing access classes is performed using the token holding timer for the node, a temporary token holding timer which is used by each class and the target token rotation timer for each class. More specifically, when the token passes to an access class within a node, any time remaining in the target token rotation timer for that class is transferred to the temporary token holding timer. Then, the target token rotation timer for that class is reset. Data from that class can then be transmitted until the time in the temporary token holding timer expires (or until the token holding timer for the node expires). In this case, transmission from a given class influences the next token rotation time of that class. If time remains in the temporary token holding timer, data can be transmitted for that class until the temporary token holding timer causes time out or all data for that class has been transmitted. If the temporary token holding timer causes time out or all data for that class has been transmitted, a service of the next access class is started when a service of an access class of the lowest level is completed, the token is transferred to the succeeding node.

In the token passing scheme defined by the ISO 88024 (IEEE 802.4) standard or the ISO 9314 (ANSI X3T9.5 FDDI) standard, each transmission control station measures a token rotation time by using an internal timer, and determines a busy state of a transmission path by comparing the measured time with a preset predictive time. If it is determined that the transmission path is not busy, data frames are transmitted in accordance with priorities of each transmission control station.

In transmission/reception processing at transmission apparatuses on the token passing LAN, data waiting for transmission are arranged in a transmission queue in an order in which transmission requests are received, and are sequentially processed for transmission in the same order. The data are then rearranged in the transmission queue in accordance with access classes and are sent to the transmission path by the above-described media access control in order.

When the data are to be received and processed, the data are arranged into a reception queue in an order in which they are received, and are processed in order.

In this case, the transmission/reception processing includes conversion/inverse-conversion between the format of data received from, e.g., a host unit and a common format of a transmission system. Examples of such conversions include addition and deletion processing of control information and identification information required to constitute a data frame and control a transmission sequence, as well as error information for guaranteeing accurate transmission, start and end processing of a monitor sequence for monitoring a transmission sequence, buffer ensuring and releasing processing for transmission/reception data frames, sequence start and end processing for ensuring, maintaining and canceling logical connection with a station at the transmitting/receiving end, and the like.

Note that transmission processing and reception processing are not preferentially performed according to the order in which data is needed at another location on the LAN. If, therefore, a large number of transmission requests having low urgencies are generated, data having high priorities cannot always be transmitted within the periods of time in which the data is needed.

Furthermore, in the above token passing scheme, media access control is distributed in all transmission control stations. Each transmission station determines for itself whether the transmission path is busy. If it is not busy, data frames are transmitted according to their priorities among the other data frames to be transmitted at each transmission control station. In other words, each transmission control station transmits data according to priority levels within that station, without knowing how the timing in which data of a given transmission request is needed compares to the timing in which data of other transmission requests is needed elsewhere in the system.

Therefore, even data having a high urgency in the overall system may be transmitted after other data having lower priorities.

SUMMARY OF THE INVENTION

The present invention has been made in consideration of the above situation, and has as its object to provide a data transmission method and apparatus which preferentially performs transmission/reception processing with respect to transmission/reception requests within each node for data needed soonest, and can preferentially transmit data needed most soon as compared to other data to be transmitted over the entire system.

In order to achieve the above object, in the present invention, the order is determined in which data associated with transmission/reception requests must be processed so as to be available when needed. Then, the transmission/reception requests are rearranged in that order. Transmission/reception processing is performed on the transmission/reception requests in the rearranged order.

When determining the order of the requests, the order in which data of transmission requests must be sent so as to be received when needed may be taken into consideration. When the order is being determined, either the absolute time at which data is needed or the period until data is needed may be utilized to determine the order.

Not only may the present invention be employed at a station level, but it may also be employed on a system level. That is, the urgency of a transmission request at a given station may be compared with the urgency of transmission requests at other stations. Then, data is transmitted corresponding to the transmission request of the given station when the urgency of the transmission request of the given station is higher than the urgency of the transmission request at the remaining stations.

Of course, the present invention may be practiced at both the station level and the network level at the same time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention, in which:

FIG. 1 is a block diagram showing a system arrangement for explaining the basic concept of the present invention;

FIG. 2 is a view for explaining the basic concept of a transmission stack according to the present invention;

FIG. 3 is a view for explaining procedures for rearranging a transmission queue according to urgencies in transmission processing according to the present invention;

FIG. 4 is a view for explaining determination processing of urgencies in transmission according to the present invention;

FIG. 5 is a view for explaining procedures for rearranging a reception queue according to urgencies in reception processing according to the present invention;

FIG. 9 is a view showing a buffer for storing transmission data DT1(j) in the first embodiment;

FIG. 10 is a view showing a control block CB1(j) in the first embodiment;

FIG. 11 is a view showing a data frame D1(j) in the first embodiment;

FIG. 12 is a view showing a transmission frame control block TCB1(j) in the first embodiment;

FIG. 13 is a view showing a transmission queue S1 in the first embodiment;

FIG. 14 is a view showing a transmission queue control word in the first embodiment;

FIG. 15 is a view showing a transmission/reception processing time table in the first embodiment;

FIG. 16 is a view showing a reception frame control block RCB1 in the first embodiment;

FIG. 17 is a view showing a reception queue R1 in the first embodiment;

FIG. 18 is a view showing a reception queue control word in the first embodiment;

FIG. 19 is a flow chart showing transmission request interrupt processing in the first embodiment;

FIG. 26 is a view showing a buffer for a transmission data DT1(j) in the second embodiment of the present invention;

FIG. 27 is a view showing a control block CB1(j) in the second embodiment;

FIG. 28 is a view showing a data frame D1(j) in the second embodiment;

FIG. 29 is a view showing a transmission frame control block TCB1(j) in the second embodiment;

FIG. 30 is a view showing a transmission request R1(j) in the second embodiment;

FIG. 31 is a view showing a transmission queue S1 in the second embodiment;

FIG. 32 is a view showing an identifier A2 control block CB2 in the second embodiment;

FIG. 33 is a view showing an identifier A2 information area buffer in the second embodiment;

FIG. 34 is a view showing a media access request frame F1 in the second embodiment;

FIG. 35 is a view showing a transmission frame control block TCB2 in the second embodiment;

FIG. 36 is a view showing a media access request R2(j) in the second embodiment;

FIG. 37 is a view showing a transmission queue S2 in the second embodiment;

FIG. 38 is a flow chart showing processing to be performed when a transmission request is received from a host unit in the second embodiment;

FIG. 39 is a flow chart showing processing to be performed when the media access request frame F1 is received in the second embodiment; and FIG. 40 is a flow chart showing processing to be performed when a token frame is received in the second embodiment.

DETAILED DESCRIPTION OF THE PREFERRED EMBODIMENTS

Figure 6A:
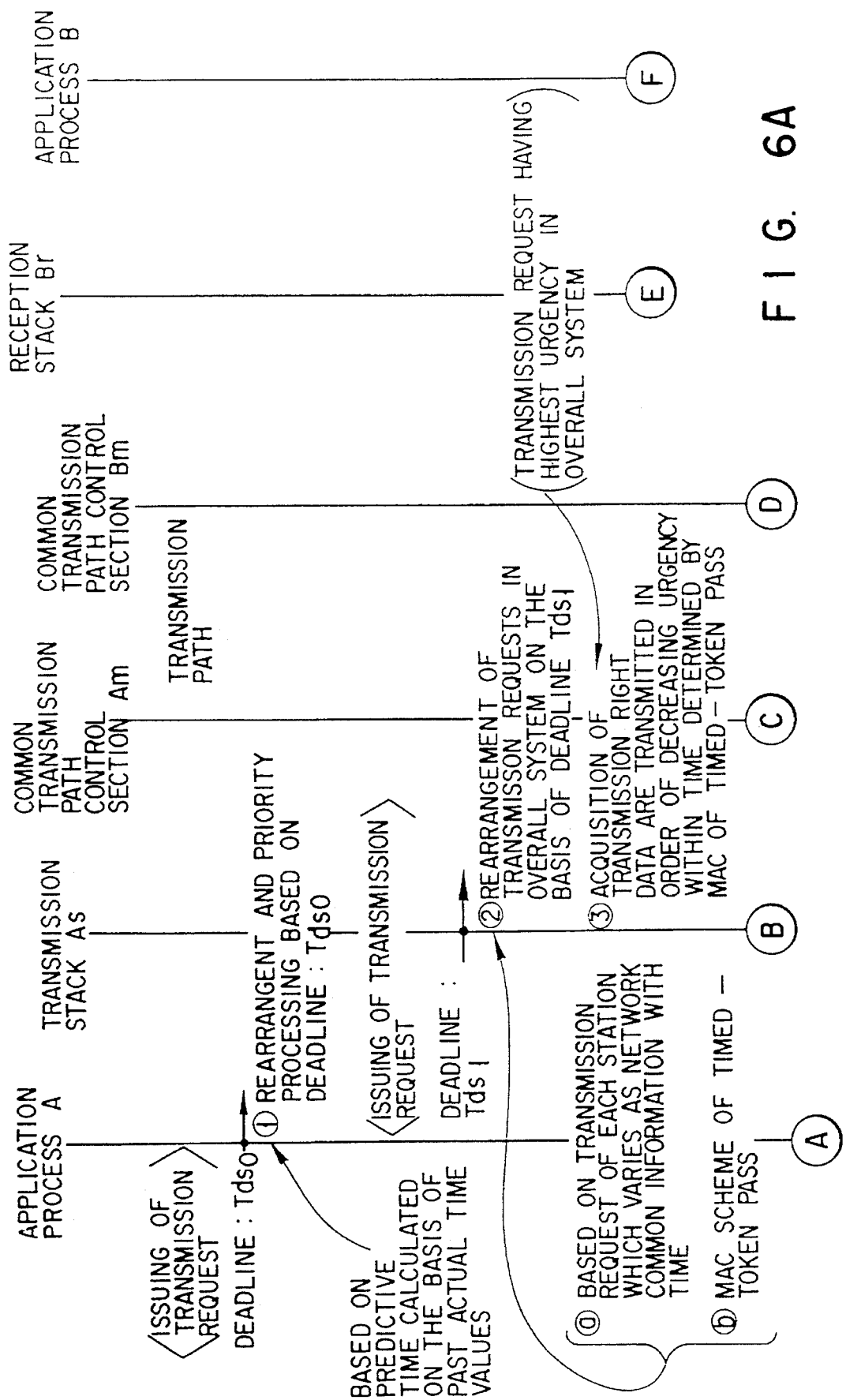
FIGS. 6A and 6B are flow charts for explaining the basic concept of the present invention.

The basic concept of the present invention will be described below with reference to FIGS. 1 to 6 prior to a description of embodiments.

FIG. 1 shows the schematic arrangement of a system. A transmission stack As and a reception stack Ar are connected to an application process A. The transmission stack As and the reception stack Ar are connected to a common transmission path through a common transmission path control section Am. Similarly, a transmission stack Bs and a reception stack Br are connected to an application process B. The transmission stack Bs and the reception stack Br are connected to the common transmission path through a common transmission path control section Bm.

As shown in FIG. 2, when the application process A generates a request to transmit predetermined data to the application process B at time T0, a margin time Tds0 is determined on the basis of the difference between time T0 and the current timing. This request is transmitted to the transmission stack As to be added to a transmission queue already formed. In this case, if the current timing is time T1, a margin time Tds1 is determined on the basis of the difference between time T0 and time T1. In the transmission stack As, it is determined that the urgency of a transmission request having a short margin time is higher than that of a transmission request having a long margin time, and the transmission queue is arranged in an order of shorter margin times.

Assume that transmission requests are ordered according to margin times of 5, 7, 8, 10, 12, and 13 to constitute a transmission queue. In this case, if a transmission request having a margin time of 6 is sent to the transmission stack As, the queue is rearranged in an order of margin times of 5, 6, 7, 8, 10, and 12. See FIG. 3.

As described above, in transmission processing, a transmission queue is not arranged in the order in which transmission requests are received but is arranged in the order in which data must be sent so that the data needed the soonest is received first.

If the time required for one rotation of a token is 2, the margin times change to 3, 4, 5, 6, 8, and 10 after one rotation of the token.

When the token rotates around the ring once and is received again by a given station, a transmission request of the station is compared with transmission requests of remaining stations. Transmission queues of nodes N1, N2, N3, and N4 are stored in a common memory, as shown in FIG. 4. In this case, the urgency of each of the start transmission requests of the nodes N1, N2, N3, and N4 is compared with that of the start transmission request of the given station. That is, each of minimum margin times of 4, 10, 6, and 7 is compared with a margin time of 3. In this case, since the transmission request of the given station has the highest urgency, a data frame of the given station is transmitted.

If the urgency of the transmission request of the given station is lower, i.e., the margin time is longer, the received token is passed to the succeeding node, and it is determined whether the urgency of a transmission request of the station in the node to which the token has been passed is high. If the transmission request has the highest urgency, a data frame of the corresponding station is transmitted.

The given station does not transmit until the urgency of its transmission request becomes higher than that of each of the transmission requests of the remaining stations. In this case, while the token is rotated, the given station waits until the urgency of its transmission request becomes the highest. When the urgency of the transmission request of the given station becomes higher than that of each of the transmission requests of the remaining stations, a data frame corresponding to the transmission request of the given station is transmitted.

As described above, in transmission processing, it is determined whether the urgency of a transmission request of the given station is high in the overall system. If it is determined that the urgency is high in the overall system, data of the given station is transmitted.

In reception processing, the same operation as in transmission processing is performed. More specifically, assume that the reception queue shown in FIG. 5 is arranged. Each number indicates a margin time corresponding to an urgency. In this case, when new data having a margin time of 2 is received, the reception queue is rearranged. Since the data having a margin time of 2 has the highest urgency, it is arranged at the start position of the reception queue to be serviced first. The data is then preferentially sent to the application process B.

In a manner similar to transmission processing, data in reception processing are not processed in the order in which they are received but are processed in the order of urgency.

In the above description, margin times correspond to the order in which data is sent so that the data needed soonest is received first. However, the present invention is not limited to this. For example, the order in which data is sent can more simply correspond to the timings (request timings) at which data are to be sent to the application process B.

Figure 6B:
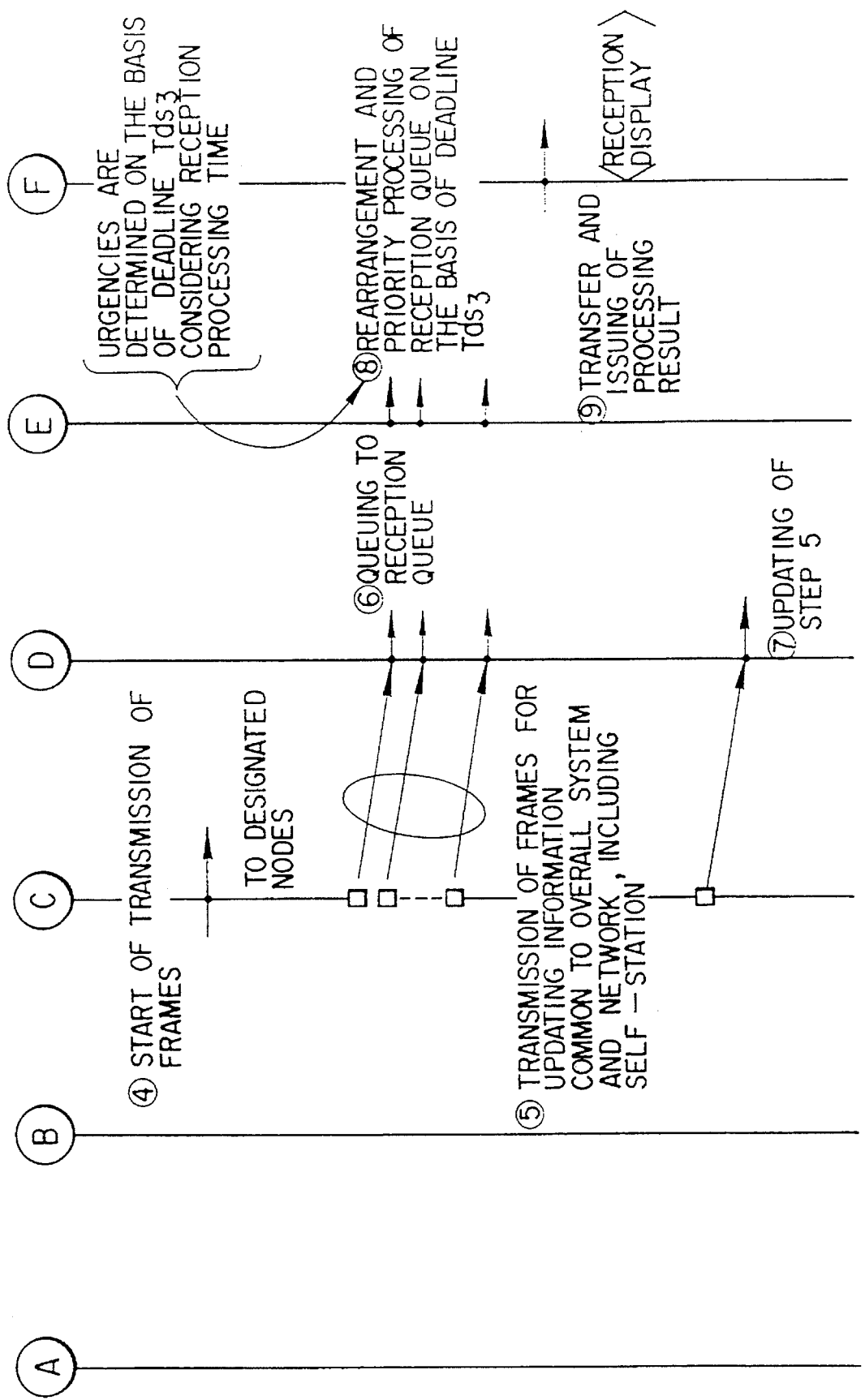

The concept of the present invention will be described in more detail below with reference to the flow diagram shown in FIGS. 6A and 6B.

If the application process A generates a transmission request having a margin time (deadline) Tds0 with respect to the application process B, the transmission stack As rearranges the transmission queue on the basis of the margin time Tds0, and performs transmission processing of a transmission request having the highest urgency first. This rearrangement processing is performed on the basis of predictive times calculated from past actual time values.

The transmission stack As subtracts the time taken to perform the transmission processing from the margin time Tds0 to set a new margin time Tds1. In this case, the overall control transmission requests of the system are rearranged on the basis of the margin time Tds1 in the order of urgencies. This rearrangement processing is executed in consideration of transmission requests of the respective stations, which vary as network common information with time with the rearrangement processing, a transmission right is assigned to a transmission request having the highest urgency at the current timing point from the viewpoint of the overall system. In this case, a margin time Tds2 is a time obtained by subtracting the time taken to perform the rearrangement processing and the time required to receive the token from the margin time Tds1. The margin time Tds2 varies with time.

Subsequently, the transmission of frames including data having high urgencies is started within the time determined by media access control (MAC) of Timed-Token Pass. The frames are respectively transmitted to designated nodes. At the same time, a frame for updating the common information of the overall system including the given station, i.e., the overall network, is transmitted to each station.

The data transmitted to the common transmission path control section Bm is queued to the reception queue and its urgency is determined on the basis of a margin time Tds3 in consideration of the time required for reception processing in the reception stack Br. The reception queue is rearranged according to the determined urgency, and data having the highest urgency is subjected to reception processing first. The margin time Tds3 is a time obtained by subtracting the transmission time from the margin time Tds2.

The data preferentially subjected to reception processing is supplied to the application process B to be received/displayed.

As described above, according to the present invention, data to be preferentially subjected to transmission/reception processing are determined on the basis of their margin times, and data which are determined to have high urgencies in the overall system are preferentially transmitted. Therefore, the system can be efficiently used, and data having high urgencies can be preferentially transmitted.

A data transmission method and apparatus according to the first embodiment of the present invention will be described below with reference to the accompanying drawings. In the first embodiment, the urgencies of transmission/reception processing of a plurality of data in each transmission apparatus are determined on the basis of margin times obtained from the request timings at which the data are required, the predictive times required to perform data transmission/reception and data transfer, and the current timing. Data having high urgencies are preferentially subjected to transmission reception processing.

Figure 7:
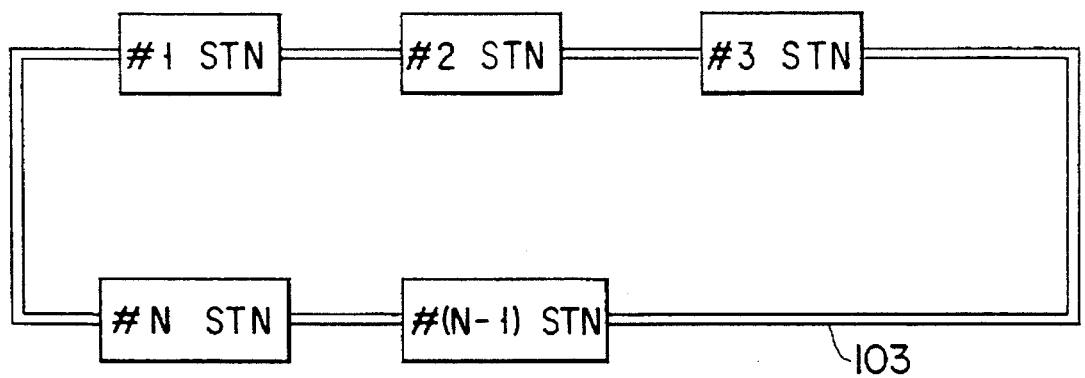
FIG. 7 is a block diagram showing an arrangement of a data transmission system according to the present invention.

As a transmission system configuration to which the present invention is applied, a ring network configuration is employed. In this configuration, transmission apparatuses are connected to each other through a common transmission path, as shown in FIG. 7. It is, however, clear that network configurations other than the configuration shown in FIG. 7, e.g., bus and star network configurations, can be employed. Referring to FIG. 7, reference symbol STN indicates a transmission apparatus.

Figure 8:
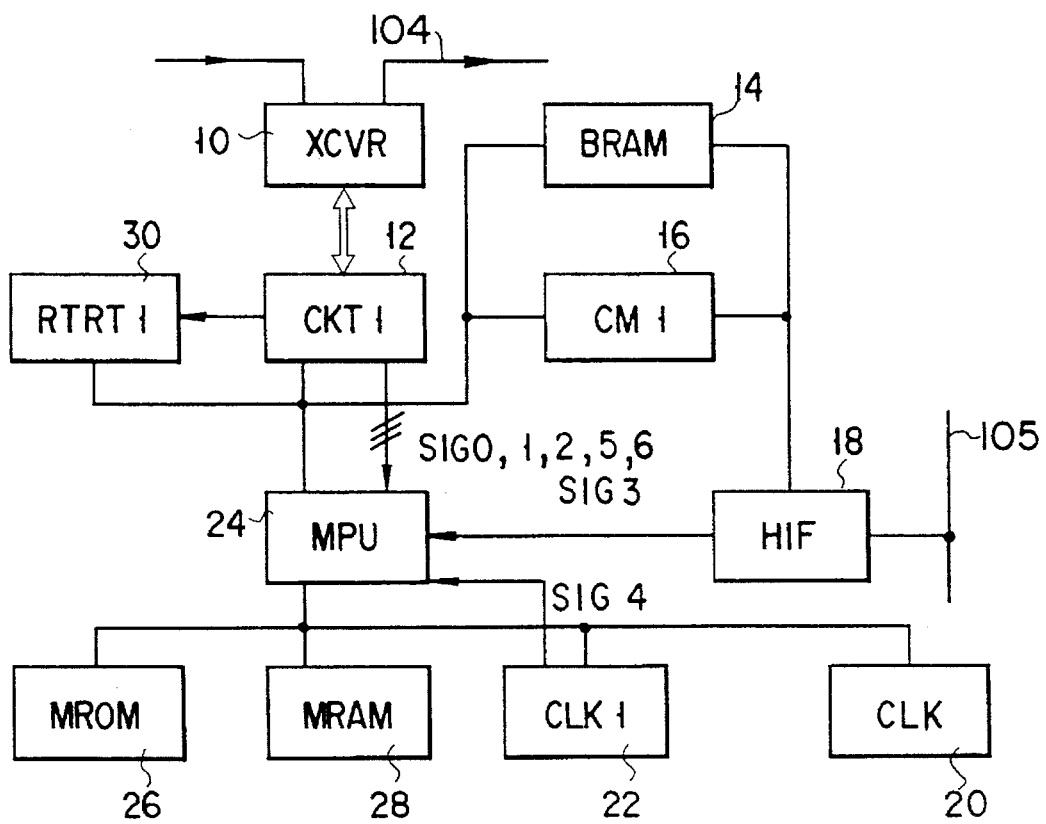
FIG. 8 is a block diagram showing a transmission apparatus constituting a data transmission system according to the first embodiment of the present invention.

As shown in FIG. 8, each transmission apparatus comprises a transmission/reception circuit (XCVR) 10 connected to a common transmission path. A token passing transmission controller (CKT1) 12 performs token passing system media access control. A transmission/reception buffer RAM memory (BRAM) 14 stores transmission/reception frame data. The transmission/reception control RAM common memory (CM1) 16 stores control data required for transmission/reception control and processing and media access control. A host request interface circuit (HIF) 18 interfaces transmission requests from host units connected thereto. Timers (CLK and CLK1) 20 and 22 in each transmission apparatus perform a common time measuring operation. A control microprocessor (MPU) 24 performs transmission/reception processing and transmission reception control of the token passing transmission controller 12. A ROM program memory (MROM) 26 stores processing programs for the control microprocessor 24. A MPU RAM memory (MRAM) 28 stores data required for processing. A token rotation timer residual value register (RTRT1) 30 holds a target token rotation timer residual value at the time of the reception of the token and allows it to be read out.

Reference symbol SIG0 denotes a token frame normal reception completion interrupt signal; SIG1, a transmission queue update inhibiting signal; SIG2, a data frame normal reception completion interrupt signal; SIG3, a transmission request interrupt signal; SIG4, a count clock interrupt signal; SIG5, a data frame transmission completion interrupt signal; and SIG6, a data frame transmission start interrupt signal.

In order to allow the control microprocessor 24 to perform transmission/reception priority processing, data tables or structures for control, formed in the transmission/reception control RAM common memory 16, the transmission/reception buffer RAM memory 14, or the MPU RAM memory 28, are designed as follows.

A data transmission request to each transmission apparatus is constituted by data DT1(j) to be transmitted, which is shown in FIG. 9, and a control block CB1(j) in FIG. 10. The data DT1(j) and the Control block CB1(j) are stored in the transmission reception buffer RAM memory 14. The control block CB1(j) includes information required for transmission control corresponding to the data DAT1(j), e.g., a destination address and a control command. Note that in the control block CB1(j), information required to execute the control scheme of the present invention is added to a control area CNT1(j) and an elapsed time information area TIM1(j), as needed. In addition, the transmission data DT1(j) is stored in one or more chained transmission buffers 14.

The control block CB1(j) includes a request timing value T0(j) at which the data DT1(j) is required for an application process of another station, and a margin time value Tds(j) to be written on the basis of a priority determined according to transmission processing.

FIG. 11 shows an arrangement of the data frame D1(j). The data frame D1(j) is stored in the transmission/reception buffer RAM memory 14. Although the arrangement of data frame D1(j) constituted by the control block CB1(j) and the transmission data DT1(j) is not specifically limited, its information portion includes the request timing T0(j).

FIG. 12 shows a frame control code, header information such as destination and source addresses, which are included in the data frame D1(j), and a transmission frame control block TCB1(j) indicating a location in which the information portion is stored. The data included in the transmission frame control block TDB1(j) is required to form the data frame D1(j). When a plurality of data frames D1(j) are to be transmitted, transmission frame control blocks TCB1(j) corresponding to the plurality of data frames D1(j) are chained to each other by designating transmission chain control areas included in the transmission frame control blocks TCB1(j). The transmission frame control block TCB1(j) chain is then linked to the transmission queue of the token passing transmission controller 12. Thereafter, the plurality of data frames D1(j) are sent to the transmission path. The transmission frame control blocks TCB1(j) are stored in the transmission/reception control RAM common memory 16.

The transmission frame control blocks TCB1(j) corresponding to the data frames D1(j) are included in the control blocks CB1(j) and are arranged in the order of the shorter margin times Tds(j) indicating urgencies so as to be formed into a transmission queue S1. FIG. 13 shows an arrangement of the transmission queue S1. This transmission queue is stored in the transmission reception buffer RAM memory 14. FIG. 14 shows the arrangement of a transmission queue control word used by the token passing transmission controller 12. The transmission queue control word is stored in the transmission/reception control RAM common memory 16.

FIG. 15 shows an arrangement of a transmission reception processing time table in which transmission processing times Tx, transfer times Txf, and the maximum and minimum values of reception processing times Tr of the respective transmission apparatuses are listed according to the addresses of the transmission apparatuses as indexes. This table is stored in the MPU RAM memory 28.

FIG. 16 shows an arrangement of a reception frame control block RCB1 indicating the location of a data frame received by the token passing transmission controller 12 and set in the transmission/reception buffer RAM memory 14 through the transmission path. The reception frame control block RCB1 is stored in the transmission/reception buffer RAM memory 14.

When a plurality of data frames D1 are received, reception chain control areas included in the reception control blocks RCB1 corresponding to the respective data frames D1 are designated to chain the reception control blocks RCB1. The reception control block RCB1 chain is then linked to the reception queue of the token passing transmission controller 12. In chaining of the reception control blocks RCB1 linked to the reception queue, priority determination based on margin times is performed by reception interrupt acceptance processing by the microprocessor 24 which has accepted the data frame normal reception completion interrupt signal SIG2, and the resultant chain is linked to the reception queue R1.

FIG. 17 shows an arrangement of the reception queue R1. FIG. 18 shows an arrangement of a reception queue control word. The reception queue R1 is stored in the transmission/reception buffer RAM memory 14. The reception queue control word is stored in the transmission/reception control RAM common memory 16.

These data tables and frame arrangements are equally applied to completion verification frames.

Priority processing in transmission/reception is performed by using the above-described data tables. An operation of the data transmission apparatus of the present invention will be described next with reference to a flow chart. This priority processing is executed by the control microprocessor 24.

FIG. 19 shows the flow chart of transmission request interrupt processing. When a host unit connected to the transmission apparatus generates a transmission request (j) to transmit a data frame, the transmission data DT1(j) shown in FIG. 9 and the control block CB1(j) shown in FIG. 10 are written in the transmission/reception buffer RAM memory 14 through the host request interface circuit 18. In addition, the transmission request interrupt signal SIG3 is supplied to the control microprocessor 24.

In step 11, the control microprocessor 24, which has received the transmission request interrupt signal SIG3, reads out the current timing from the timer 22 and stores it, as a request acceptance timing T1(j), in the elapsed time information area of the control block CB1(j).

In step 12, the control microprocessor 24 forms the transmission frame control block TCB1(j) from the control block CB1(j) and the transmission data DT1(j).

In step 13, the control microprocessor 24 reads out a destination transmission apparatus address (k) written in the control block CB1(j). The control microprocessor 24 reads out a minimum value Tr(k)min of the reception processing time of the destination transmission apparatus and a maximum value Txf(K)max of the transmission time required for transmission to the destination transmission apparatus from the transmission/reception processing time table shown in FIG. 15 by using the readout address value as an index, and obtains a sum Ti(k) of the readout data.

In step 14, the control microprocessor 24 reads out a request timing T0(j) written in the control block CB1(j), obtains the difference between the readout data and the sum T1(k), and stores it in the margin time area of the control block CB1(j).

In step 15, the control microprocessor 24 checks whether any transmission requests are already linked to the transmission queue S1 shown in FIG. 13. If the determination in step 15 is NO, it means that the new transmission request being processed will be the only transmission request in transmission queue S1. Therefore, the flow advances to step 24 to link the transmission frame control block TCB1(j) to be the only transmission frame control block in the transmission queue S1, thus starting the transmission processing program.

If the determination in step 15 is YES, then other transmission frame control blocks are already in transmission queue S1, and it is necessary to insert the new transmission frame control block in the right order. Therefore, the flow advances to step 16. In step 16, the control microprocessor 24 sequentially checks the transmission frame control blocks TCB1 linked, as a chain to the transmission queue S1. More specifically, the control microprocessor 24 reads out a request timing T0(i) of each transmission frame control block TCB1(i). In addition, the control microprocessor 24 reads out the destination transmission apparatus, and reads out a minimum value Trmin of the reception processing time and a maximum value Txfmax of the transmission time from the transmission/reception processing time table by using the address value. The control microprocessor 24 obtains a sum Ti of the readout data, and calculates the difference between the request timing T0(i) and the sum Ti to obtain a margin time Tds(i).

In step 17, the control microprocessor 24 compares the already obtained margin time Tds(j) associated with the transmission/reception (j) and the margin time Tds(i) of a linked transmission request (i) to check whether the margin time Tds(j) is shorter (urgency is higher).

If the determination in step 17 is YES, the flow advances to step 18. In step 18, the control microprocessor 24 separates the transmission frame control block TCB1(i) from the transmission queue S1, and chains the transmission frame control block TCB1(j) to a position before the transmission frame control block TCB1(i).

In step 22, the control microprocessor 24 checks whether the transmission frame control block TCB1(j) is located at the start position of the transmission queue S1. If the determination step 22 is YES, the flow advances to step 23 to interrupt transmission processing corresponding to the transmission frame control block TCB1 and switch to transmission processing corresponding to the transmission frame control block TCB1(j).

If the determination in step 22 is NO, the control microprocessor 24 continues the transmission processing currently performed.

If it is determined in step 17 that the margin time Tds(j) is longer, the flow advances to step 20, and the control microprocessor 24 checks whether the transmission frame control block TCB1(i) is located at the end position of the transmission queue S1. If the determination in step 20 is YES, the flow advances to step 21 to chain the transmission frame control block TCB1(j) behind the transmission frame control block TCB1(i) and increment the total number of transmission frame control blocks linked to the transmission queue S1 by one.

If the determination in step 20 is NO, the flow advances to step 19. In step 19, the control microprocessor 24 checks a margin time associated with a transmission frame control block TCB1(i+1) chained next by using the chain control information of the transmission frame control block TCB1(i). The flow then returns to step 16. In step 16, the control microprocessor 24 executes the subsequent processing in accordance with the above-described flow chart.

If it is determined that the margin time Tds(j) associated with the transmission request (j) is equal to the margin time Tds(i) of the linked transmission request (i), the control microprocessor 24 rearranges the transmission queue S1 such that transmission processing is preferentially performed with respect to a transmission frame control block having a control block CB1 holding an earlier request acceptance timing T1 in its elapsed time information area.

Figure 20:
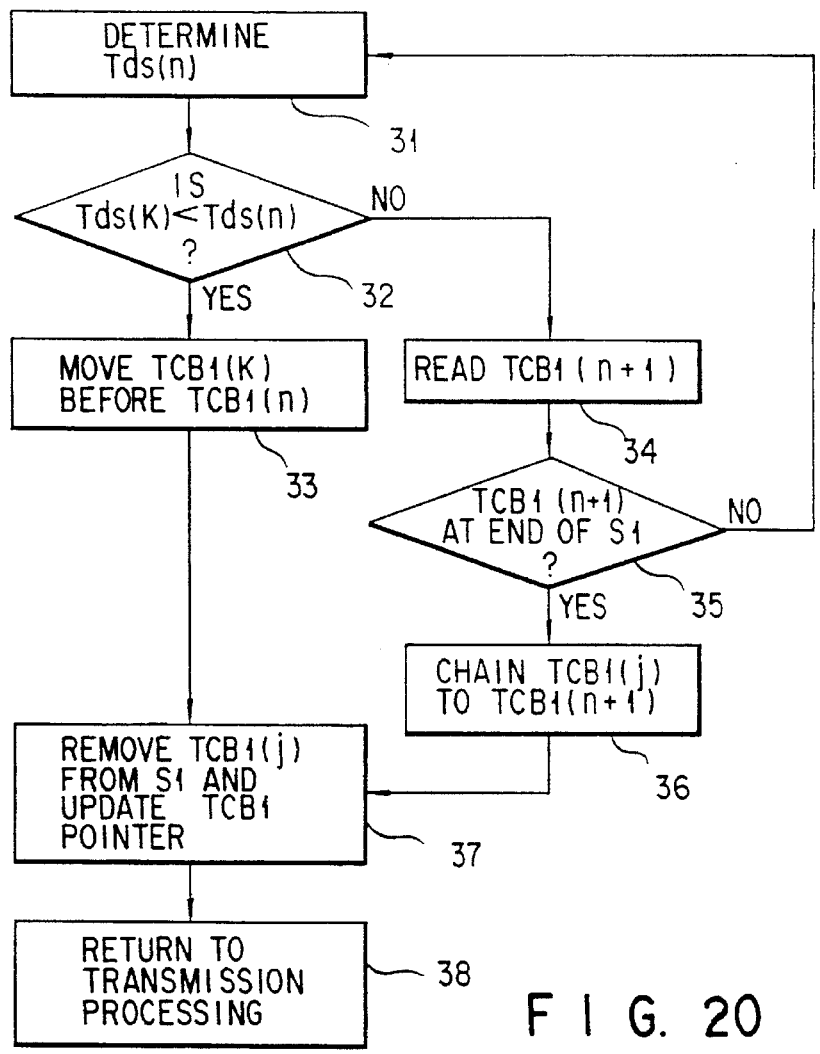
FIG. 20 is a flow chart showing processing upon completion of transmission processing in the first embodiment.

Processing upon completion of transmission processing will be described below with reference to FIG. 20. This processing is also executed by the control microprocessor 24. In the processing, when transmission processing is completed, i.e., the data frame associated with transmission frame control block TCB1(i) has been sent, the transmission frame control block TCB1(j) is removed from the transmission queue S1. That is, the TCB1 pointer value indicating the start transmission frame control block of the transmission queue S1 is updated to a TCB1 pointer value indicating a transmission frame control block TCB1(k) chained next.

It is then necessary to confirm that TCB1(k) remains the next most urgent data to be sent. To accomplish this the current margin time for TCB1(k) is compared to the margin times for the other frame control blocks in transmission queue S1.

In step 31, the control microprocessor 24 reads out a request timing T0(n), a corresponding transfer time Txf(n), and a reception time Tr(n) from a transmission frame control block TCB1(n) linked to the transmission queue of the transmission controller 12 so as to obtain a current margin time Tds(n).

In step 32, the control microprocessor 24 compares the margin time Tds(n) with the margin time Tds(j) of the transmission frame control block TCB1(j) to check whether the margin time Tds(j) is shorter (urgency is higher). If the determination in step 32 is YES, the flow advances to step 33 to separate the transmission frame control block TCB1(n) from the transmission queue and chain the transmission frame control block TCB1(j) before the transmission frame control block TCB1(n). Note that if the transmission queue update inhibiting signal SIG1 is issued, and transmission completion display (TSTATUS) data for the transmission frame control block TCB1 chained immediately before the transmission frame control block TCB1(n) is being transmitted, the transmission frame control block TCB1(j) is chained to the transmission frame control block TCB1(n) to rearrange the transmission queue.

The flow then advances to step 37. In step 37, the control microprocessor 24 removes the transmission frame control block TCB1(j) from the transmission queue S1 and updates the TCB1 pointer value indicating the start position of the transmission queue.

In step S38, the control microprocessor 24 causes the flow to return to the first step in transmission processing.

If it is determined in step 32 that the margin time Tds(j) is longer, the flow advances to step 34. In step 34, the control microprocessor 24 reads out a transmission frame control block TCB1(n+1) chained next by using the control information of the transmission frame control block TCB1(n).

The flow then advances to step 35, in which the control microprocessor 24 checks whether the transmission frame control block TCB1(n+1) is located at the end position of the transmission queue. If the determination in step 35 is YES, the flow advances to step 36 to chain the transmission frame control block TCB1(j) to the transmission frame control block TCB1(n+1). Note that if the transmission queue update inhibiting signal SIG1 is issued, and transmission completion display (TSTATUS) data for the transmission frame control block TCB1(n) is being transmitted, transmission of the transmission frame control block TCB1(j) is delayed until the next token reception timing.

If step 36 is completed, the flow advances to step 37. In step 37, the control microprocessor 24 performs the above-described processing.

If the determination in step 35 is NO, the flow returns to step 31, and the control microprocessor 24 proceeds with the processing in accordance with the above-described flow chart.

Figures 21, 22:
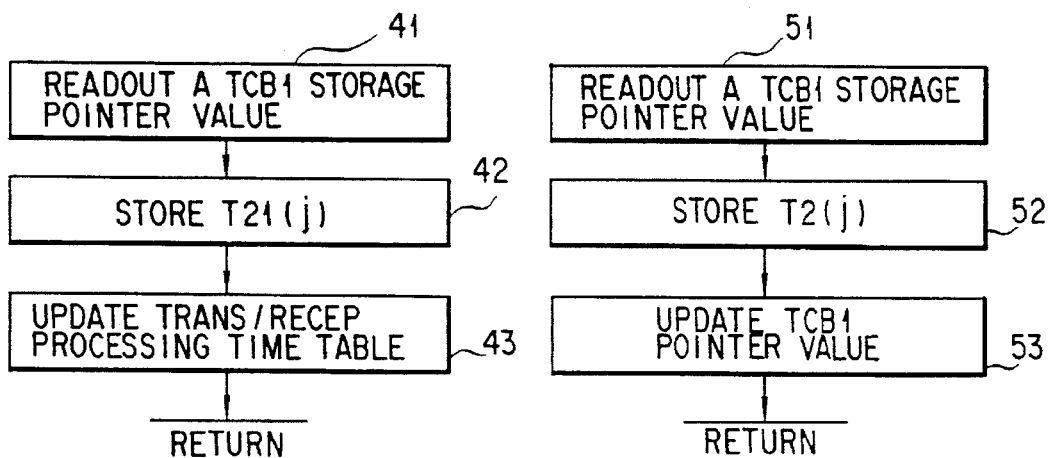
FIG. 21 is a flow chart showing data frame transmission start interrupt signal processing in the first embodiment.
FIG. 22 is a flow chart showing data frame transmission completion interrupt signal processing in the first embodiment.

Data frame transmission start interrupt signal processing will be described below with reference to FIG. 21. This flow chart shows a case wherein the token passing transmission controller 12 receives the token and starts to send a data frame corresponding to the transmission frame control block TCB1(j) linked to the transmission queue to the transmission path. This processing is also executed by the control microprocessor 24.

In step 41, upon reception of the data frame transmission start interrupt signal SIG6 from the token passing transmission controller 12, the control microprocessor 24 reads out a TCB1 storage pointer value from the transmission queue word shown in FIG. 14, and checks whether the transmission completion display (TSTATUS) area data of the transmission frame control block TCB1(j) is being transmitted.

In step 42, the control microprocessor 24 reads out a data frame transmission start timing T21(j) from the timer 22 and stores it in the elapsed time information area of the control block CB1(j) corresponding to the transmission frame control block TCB1(j).

In step 43, control microprocessor 24 reads out a request acceptance timing T1(j) of the transmission frame control block TCB1(j), and calculates the difference between the readout data and the data frame transmission start timing T21(j) to obtain a transmission processing time Tx(j), thus updating the transmission/reception processing time table. In this case, the current value is compared with the maximum or minimum value registered in the past. If the current value is larger than the maximum value, the maximum value is updated by the current value. When the current value is smaller than the minimum value, the minimum value is updated by the current value.

Data frame transmission completion interrupt signal processing will be described next with reference to FIG. 22. This processing is also executed by the control microprocessor 24.

In step 51, upon reception of the data frame transmission completion interrupt signal SIG5, the control microprocessor 24 reads out a TCB1 storage pointer value from the transmission queue, and checks whether transmission of the transmission completion display (TSTATUS) area data of the transmission frame control block TCB1(j) is completed.

In step 52, the control microprocessor 24 reads out the data frame transmission completion timing T2(j) from the timer 22 and stores it in the elapsed time information area of the control block CB1(j) corresponding to the transmission frame control block TCB1(j).

In step 53, the control microprocessor 24 updates the TCB1 pointer value, of the transmission queue control word, indicating the start transmission frame control block to a TCB1 pointer value indicating a transmission frame control block chained next.

Transmission processing has been described above. Reception processing will be described below.

Figure 23:
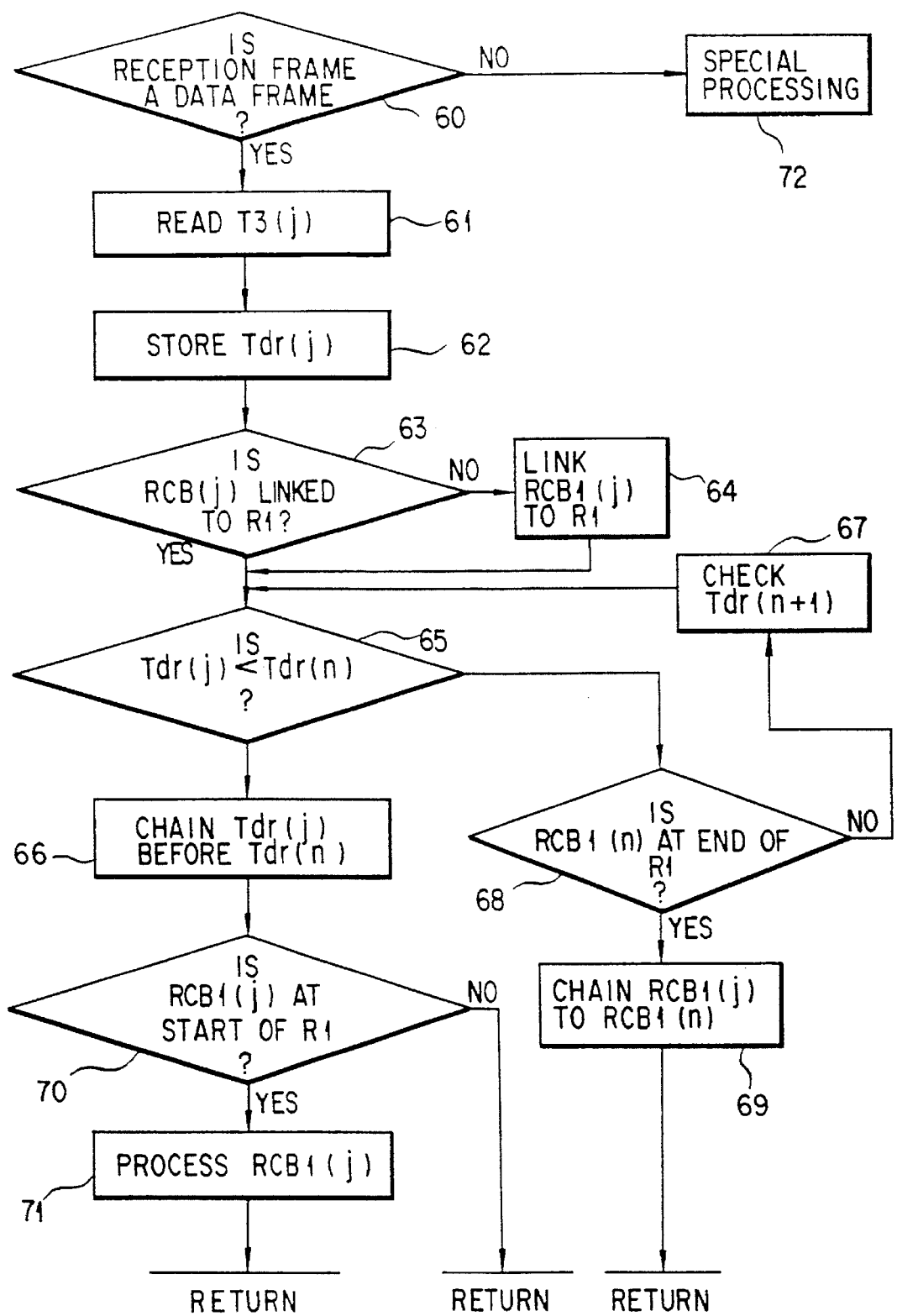
FIG. 23 is a flow chart showing data frame normal reception completion interrupt signal processing in the first embodiment.

Data frame normal reception completion interrupt signal processing will be described below with reference to FIG. 23. This processing is also executed by the Control microprocessor 24.

In step 60, upon reception of the data frame normal reception completion interrupt signal SIG2, the control microprocessor 24 reads out a pointer value indicating a reception control block RCB1(j) from the reception queue and checks whether the reception frame stored in the transmission/reception buffer RAM memory 14 is a data frame. If it is not a data frame, the flow advances to step 72. In this case, since the reception frame is a completion verification frame or a reception frame other than a data frame, the control microprocessor 24 starts a special reception processing program.

If the reception frame is a data frame, the flow advances to step 61 in which the control microprocessor 24 reads out a reception acceptance T3(j) from the timer 22.

In step 62, the control microprocessor 24 stores the reception acceptance timing T3(j) in the elapsed time information area of the reception control block RCB1(j). In addition, the control microprocessor 24 reads out a request timing T0(j) of the reception data frame, obtains the difference between the request timing T0(j) and the reception acceptance timing T3(j), and stores it, as a margin time Tdr(j), in the margin time area of the reception control block RCB1(j).

In step 63, the control microprocessor 24 checks whether a reception control block RCB1(j) is linked to the reception queue R1. If the determination in step 63 is NO, the flow advances to step 64. In step 64, the control microprocessor 24 links the reception control block RCB1(j) to the reception queue R1 and starts to execute the reception processing program.

If the determination in step 63 is YES, the flow advances to step 65. In step 65, the control microprocessor 24 compares a margin time Tdr(n) of a reception control block RCB1(n) linked to the reception queue R1 with the margin time Tdr(j) of the reception control block RCB1(j) to check whether the margin time Tdr(j) is shorter (urgency is higher).

If the determination in step 65 is YES, the flow advances to step 66. In step 66, the control microprocessor 24 separates the reception control block RCB1(n) from the reception queue R1 and chains the reception control block RCB1(j) before the reception control block RCB1(n).

In step 70, the control microprocessor 24 checks whether the reception control block RCB1(j) is located at the start position of the reception queue R1. If the determination in step 70 is NO, the control microprocessor 24 proceeds with the currently performed reception processing.

If the determination in step 70 is YES, the flow advances to step 71. In step 71, the control microprocessor 24 interrupts reception processing corresponding to the currently processed reception control block RCB1, and switches to reception processing corresponding to the reception control block RCB1(j).

If the determination in step 65 is NO, the flow advances to step 68. In step 68, the control microprocessor 24 checks whether the reception control block RCB1(n) is located at the end position of the reception queue R1. If the determination in step 68 is YES, the flow advances to step 69. In step 69, the control microprocessor 24 chains the reception control block RCB1(j) next to the reception control block RCB1(n) and increments the total number of reception control blocks linked to the reception queue R1 by one.

If the determination in step 68 is NO, the flow advances to step 67. In step 67, the control microprocessor 24 checks the margin time of a reception control block RCB1(n+i) chained next by using the chain information of the reception control block RCB1(n). Flow then returns to step 65 and the control microprocessor 24 executes the subsequent processing in accordance with the above-described flow chart.

Note that if it is determined in step 63 that the margin time Tdr(j) is equal to the margin time Tdr(i), the reception queue R1 is rearranged such that reception processing is preferentially performed with respect to the reception control block RCB1 having an earlier reception acceptance timing T3 held in the elapsed time information area.

Figure 24:
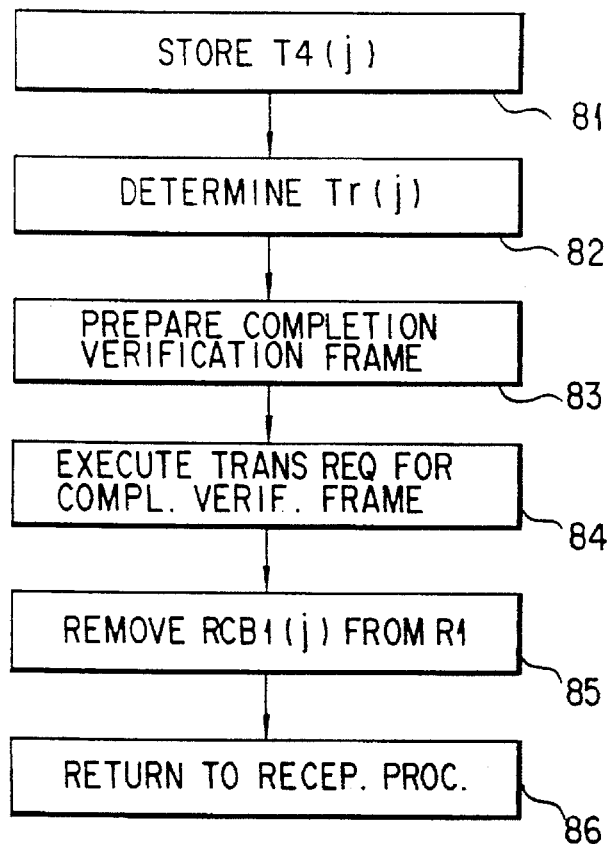
FIG. 24 is a flow chart showing processing upon completion reception processing in the first embodiment.

Reception completion processing will be described below with reference to FIG. 24. This processing is also executed by the control microprocessor 24. In step 81, the control microprocessor 24 reads out a reception completion timing T4(j) from the timer 22 and stores it in the elapsed time information area of the reception control block RCB1(j).

The flow then advances to step 82. In step 82, the control microprocessor 24 reads out the reception acceptance timing T3(j) from the elapsed time information area, and calculates a reception processing time Tr(j) by obtaining the difference between the reception acceptance timing T3(j) and the reception completion timing T4(j).

In step 83, the control microprocessor 24 reads out a destination address, an identifier for identifying a transmission request, and the like from the data frame stored in the transmission/reception buffer RAM 14, and forms a control block CB1 for a completion verification frame, and transmission data DT1 by using these readout data. The completion verification frame includes normal completion information, completion state information indicating that an error was caused during processing, and the processing could not be normally completed, and time information including the reception acceptance timing T3(j) of the data frame and the reception processing time Tr(j) taken to complete normal processing. The control microprocessor 24 sends the completion verification frame to the transmission station. The reception data which has undergone reception processing is transmitted to the host unit connected to the transmission apparatus through the host request interface circuit 18.

In step 84, the control microprocessor 24 starts to execute the transmission request.

The flow then advances to step 85, in which the control microprocessor 24 removes the reception control block RCB1(j) from the reception queue R1. That is, the control microprocessor 24 updates the RCB1 pointer value indicating the start reception control block of the reception queue R1 to an RCT1 pointer value indicating a reception control block chained next.

In step 86, the control microprocessor 24 causes the flow to return to the first step of reception processing.

In the source transmission apparatus, a plurality of transmission requests are generated, while the processing between steps 81 and 86 is performed, i.e., the apparatus waits for a completion verification frame from the destination transmission apparatus, which corresponds to a completely transmitted data frame. In this case, the control microprocessor 24 forms and transmits data frames in response to the transmission requests. In addition, the control microprocessor 24 performs the above-described reception processing in response to a reception request from another transmission apparatus.

Figure 25:
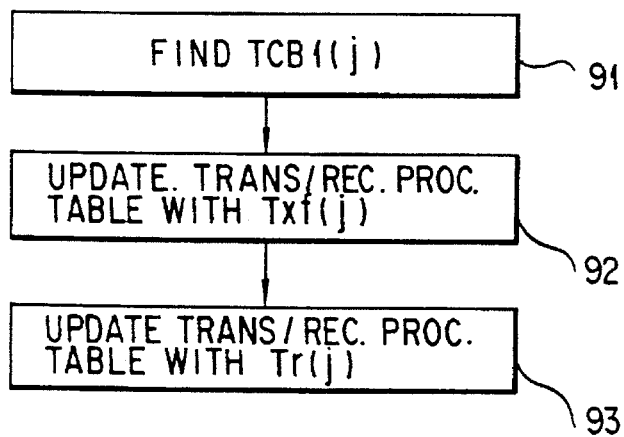
FIG. 25 is a flow chart showing completion verification frame reception processing in the first embodiment.

Reception processing of a completion verification frame will be described below with reference to FIG. 25. This processing is also executed by the control microprocessor 24.

In step 91, when the transmission/reception circuit 10 receives a completion verification frame, the control microprocessor 24 finds the transmission frame control block TCB1(j) according to transmission identification information included in the reception frame.

In step 92, the control microprocessor 24 reads out the transmission completion timing T2(j), obtained at the time of data frame transmission, from the elapsed time information area of the control block CB1(j) of the transmission frame control block TCB1(j) and further reads out the reception acceptance timing T3(j) included in the completion verification frame. The control microprocessor 24 obtains the difference between the readout data to calculate a transfer time Txf(j) required to transfer the data frame through the common transmission path, and holds it in the transmission reception processing table shown in FIG. 15.

In this case, the control microprocessor 24 compares the current value of transfer time with the maximum and minimum values registered in the past. If the current value is larger than the maximum value, the maximum value is replaced with the current value. If the current value is smaller than the minimum value, the minimum value is replaced with the current value.

In step 93, if the completion verification frame indicates a normal completion state, the control microprocessor 24 reads out the reception processing time Tr(j) included in the completion verification frame and registers it in the transmission/reception processing time table according to the destination transmission apparatus address as an index. In this case, the control microprocessor 24 also compares the current value of reception processing time with the maximum and minimum values registered in the past. If the current value is larger than the maximum value, the maximum value is replaced with the current value. If the current value is smaller than the minimum value, the minimum value is replaced with the current value.

The description of the data transmission method and apparatus according to the first embodiment is completed herein.

Note that in the transmission request interrupt processing shown in FIG. 19, with respect to a transmission request whose margin time Tds(j) is a negative value, the control microprocessor 24 may determine that data transmission cannot be performed at the request timing T0(j), cancel the transmission request, and inform the transmission request source of the determination result.

When a source transmission apparatus is to transmit a data frame, the transmission completion timing T2(j) may be included in the data frame together with the request timing T0(j). Upon reception and verification of the data frame, a destination transmission apparatus may obtain the transfer time Txf(j) by detecting the difference between the transmission completion timing T2(j) and the reception verification timing T3(j). In addition, reception processing is performed by the destination transmission apparatus to calculate the reception processing time Tr(j). The transfer time Txf(j) and the reception processing time Tr(j) may be transmitted to the source transmission apparatus to update the transmission/reception processing table of the source transmission apparatus.

Transmission processing times Tx, reception processing times Tr, and transfer times Txf taken to transfer data to predetermined transmission apparatuses may be held in all the transmission apparatuses according to the transmission apparatus addresses as indexes. When a given transmission apparatus receives a transmission request, the apparatus reads out these time values according to the source transmission apparatus address as an index. The destination transmission apparatus obtains the sum of the transmission processing time of the destination station, the reception processing time of the source transmission apparatus, and the transfer time required to transfer data to the source transmission apparatus. In this manner, a transmission request from a given transmission apparatus is processed by a destination transmission apparatus to calculate a predictive total processing time Ta. The difference between the predictive total processing time Ta and the request timing T0 may be obtained as a margin time Tds, and priority processing may be performed by determining an urgency on the basis of this margin time Tds.

A destination transmission apparatus may calculate the reception verification timing T3 and the sum of the reception timing time Tr, the transmission processing time Tx, the transfer time Txf required to transfer data to a source transmission apparatus, and the reception processing time Tr of the destination transmission apparatus, which time data are held in the destination station. The apparatus then calculates the difference between the request timing T0 read out from the data frame to obtain the margin time Tds. The urgency may be determined on the basis of this margin time Tds to perform reception processing according to the priority.

A data transmission method and apparatus according to the second embodiment of the present invention will be described next. In this embodiment, the priority sequence data of data transmission of each transmission apparatus is supplied to other transmission apparatuses, and the urgency of each data transmission is determined in the overall system. Thus, the transmission right is assigned to one of the transmission apparatuses on the basis of the urgencies determined in the overall system.

The second embodiment is applied to the same system as that shown in FIG. 7 to which the first embodiment is applied. The arrangement of each of the transmission apparatuses constituting the system is the same as that of the one shown in FIG. 8, but their operations are different from each other.

This system has an MAC function corresponding to the media access control scheme defined by the ISO 88024 (or IEEE 802.4) standard or the ISO 9314 (ANSI X3T9.5) standard. That is, each transmission apparatus which receives a token frame indicating assignment of the transmission right has modes M1 and M2.

In the mode M1, upon reception of the token frame, each apparatus can always transmit a required number of data frames.

In the mode M2, the time taken for one rotation of the token frame is measured by a timer of each transmission apparatus which is designed to measure a token frame rotation time. If the measured value is smaller than a preset time value, the number of data frames corresponding to the difference between the time values (a target token rotation timer residual value TRT1) can be transmitted. If the token rotation time value is larger than the preset value, transmission of a data frame is postponed.

In order to allow a control microprocessor 24 to perform priority transmission right assignment processing, a control data table formed in a transmission/reception control RAM common memory 16, a transmission/reception buffer RAM memory 14, or an MPU RAM memory 28 has the following arrangement.

A data transmission request to each transmission apparatus is constituted by data DT1(j) to be transmitted, shown in FIG. 26, and a control block CB1(j) shown in FIG. 27. The data DT1(j) and the control block CB1(j) are stored in the transmission reception buffer RAM memory 14. The control block CB1(j) includes information required for transmission control corresponding to the data DT1(j), e.g., a destination address and a control command. Note that in the control block CB1(j) information required for the execution of the control scheme of the present invention is added to a control area CNT1(j) and an elapsed time information area TIM1(j), as needed. The transmission data DT1(j) is stored in one or more chained transmission buffers 14.

The control block CB1(j) includes an identifier A1 representing the urgency of the transmission data in the transmission apparatus. This identifier A1 includes a request timing T0(j) at which the data DT1(j) is to be received by a destination application process. In this case, as the identifier A1 representing the urgency of the data, for example, a timing at which transmission of the data is to be completed in the source transmission apparatus, or a timing at which the data is to be received by the destination transmission apparatus may be used.

Data frame D1(j) constituted by the control block CB1(j) and the transmission data DT1(j) is not limited to any specific arrangement. For the execution of the present invention, however, the information portion of the data frame D1(j) includes the identifier A1 and elapsed time information indicating the elapsed time of communication processing. FIG. 28 shows an arrangement of the data frame D1(j). The data frame D1(j) is stored in the transmission buffer 14.

FIG. 29 shows an arrangement of a transmission frame control block TCB1(j) including a frame control code, header information such as destination and source addresses, which are to be included in the data frame D1(j), and information indicating the location of an information portion. The data included in the transmission frame control block TCB1(j) are required to form the data frame D1(j). When a plurality of data frames D1(j) are to be transmitted, the transmission chain control area of each transmission frame control block TCB1(j) is designed to chain the respective transmission frame control blocks TCB1(j) corresponding to the plurality of data frames D1(j). The transmission frame control blocks TCB1(j) are stored in the transmission reception control RAM common memory 16.

Transmission requests R1(j) corresponding to the data frames D1(j) are ordered to be formed into a transmission queue S1 on the basis of values T0(j) of the identifiers A1 included in the control blocks CB1(j) and representing the urgencies of the data frames. FIG. 30 shows an arrangement of the transmission queue R1(j). FIG. 31 shows an arrangement of the transmission queue S1. In this arrangement, the transmission queue S1 is designed such that the transmission requests R1(j) of the transmission apparatus are chained to each other according to their urgencies. The transmission requests R1(j) and the reception queue S1 are stored in the transmission/reception buffer RAM memory 14.

An identifier A2 included in the transmission queue S1 indicates the presence of an urgent transmission request of the transmission apparatus. FIGS. 32 and 33 show an arrangement of the identifier A2. FIG. 32 shows an identifier A2 control block CB2. FIG. 33 shows an identifier A2 information area buffer. The identifier A2 includes at least the identifier A1 corresponding to the transmission request R1(j) having the highest urgency in the transmission queue S1.

A media access request frame F1 including the identifier A2 is not limited to any specific arrangement. FIG. 34 shows an arrangement of the media access request frame F1. The media access request frame F1 may have any kind of arrangement as long as it can be discriminated from the data frame D1(j) shown in FIG. 28, the token frame, and other transmission control frames, and its information portion includes the information of the identifier A2. That is, in the data frame D1(j) shown in FIG. 28, a "frame control" code corresponding to the media access request frame F1 may be set, and the identifier A2 may be included in a "information portion". In the arrangement shown in FIG. 34, identification is performed by the "frame control" code. The media access request frame F1 is stored in the transmission/reception buffer RAM memory 14.

FIG. 35 shows an arrangement of a transmission control block TCB2. The transmission control block TCB2 indicates the locations of a frame control code, header information such as destination and source addresses, and an information portion, which are required to form the media access request frame F1. The transmission control block TCB2 is stored in the transmission reception control RAM common memory 16.

FIG. 36 shows an arrangement of a media A2 included in a media access request frame transmitted from each transmission apparatus and received by each transmission apparatus. The media access request R2(j) corresponds to each of a plurality of media access requests included in the identifiers A2 in the media access request frames F1. The media access requests R2(j) are stored in the transmission/reception buffer RAM memory 14.

FIG. 37 shows an arrangement of a transmission queue S2 in which the media access requests R2(j) are ordered according to their urgencies determined in the overall system. In the transmission queue S2, the media access requests R2(j) from the respective transmission apparatuses are chained to each other. The transmission queue S2 is stored in the transmission/reception buffer RAM memory.

The flow of transmission request control processing performed by the control microprocessor 24 using the above data tables will be described below.

When a host unit connected to the transmission apparatus generates a transmission request to transmit a data frame, the transmission data shown in FIG. 26 and the control block CB1 shown in FIG. 27 are written in the transmission/reception buffer RAM memory 14 through a transmission request interface circuit 18. In addition, a transmission interrupt signal SIG3 is sent to the control microprocessor 24. Subsequently, the control microprocessor 24 starts the flow of processing to be performed when a transmission request from a host unit is received.

In step 110, the control microprocessor 24 forms the transmission frame control block TCB1(j) and the transmission request R1(j) from the control block CB1(j) and the transmission data DT1(j).

In step 120, the control microprocessor 24 compares an identifier A1(T0(j)) included in the control block CB1(j) designated by the transmission request R1(j) with an identifier A1(T0(k)) of a transmission request R1(k) already linked to the transmission queue S1. Thereafter, the control microprocessor 24 rearranges the transmission queue S1 in an order of higher urgencies. That is, the control microprocessor 24 chains the transmission request R1(j) to the transmission queue S1 by using the PRE and NEXT areas of the transmission request R1(j).

In step 130, the transmission frame control block TCB1(j) is chained to a transmission control block TCB1(k) of the already linked transmission request R1(k) in accordance with the order in the transmission queue S1 by using the transmission control block chain control area.

In step 140, the control microprocessor 24 forms the identifier A2 information area buffer shown in FIG. 33. The control microprocessor 24 chains the identifier A2 information area buffer to the identifier information area of the already linked transmission request R1(k) in accordance with the order in the transmission queue S1 by using the transmission data buffer control area and the transmission data start, intermediate, and end display areas.

When the media access request frame F1 is received, the control microprocessor 24 starts the flow of processing to be performed when the media access request frame F1 shown in FIG. 39 is received.

In step 210, the control microprocessor 24 forms a transmission request indicating an urgency determined from the viewpoint of the overall system, i.e., the media access request R2(j) shown in FIG. 36, on the basis of the information of the identifier A2 included in the media access request frame F1 and source station address indicating the source station.

In step 220, the control microprocessor 24 compares the urgency of the media access request R2(j) with that of a media access request R2(k) already linked to the transmission queue S2 by using the value of the identifier A1=TN. Thereafter, the control microprocessor 24 rearranges the transmission queue S2 in an order of higher urgencies by using the PRE and NEXT areas.

With respect to the transmission queue S2 to which the transmission request R2(k) has already been linked, the control microprocessor 24 starts comparison determination processing from the start position of the transmission queue S2. If information coinciding with a source transmission apparatus address SA is detected in the transmission request R2(k) already linked to the transmission queue S2, the control microprocessor 24 removes the transmission request R2(k) from the transmission queue S2. This processing is limited to comparison determination processing with the first identifier A2 included in the received media access request frame F1. In addition, the control microprocessor 24 compares the identifier A2 with a value Tk representing the urgency of the transmission request R2(k), and rearranges the link structure of transmission queue S2 such that the newly formed transmission request R2(j) is ordered according to its urgency.

In step 230, the control microprocessor 24 compares the transmission queue S2, formed every time the media access request frame F1 is received, with the transmission queue S1 formed in accordance with the transmission requests from the host unit. If the urgency of the transmission request of the station is higher, the control microprocessor 24 links a data frame D1 corresponding to the transmission request having a high urgency to a transmission queue TQ2 corresponding to the mode M2 of the MAC function of a transmission controller 12. That is, the control microprocessor 24 sets the start storage address of the transmission control block TCB1 chain in the transmission queue TQ2.

When the token frame is received, the control microprocessor 24 performs processing in accordance with the flow chart for token frame reception processing shown in FIG. 40.

In step 310, with respect to the data frame D1 linked to the transmission queue TQ2, the control microprocessor 24 reads out the target token rotation timer residual value TRT1 corresponding to the mode M2 of the MCA function from a token rotation timer residual value register 30 when it obtains the transmission right upon reception of the token. Subsequently, the control microprocessor 24 calculates the number of data frames D2 corresponding to the residual time value on the basis of the total transmission data count out of the total number of data frames D1(j) to be transmitted.

The number of data frames D2 (the total number of data frames to be transmitted D1≧the number of data frames D2 that can be sent during the residual time value) are supplied to the transmission path through the token passing transmission controller 12 upon reception of the token.

In step 320, the control microprocessor 24 removes the transmission requests R1(j) corresponding to the above-mentioned data frames D1(j) from the transmission queue S1. If a transmission request is left, the control microprocessor 24 writes the storage address of the identifier A2 information area buffer of the transmission request in the identifier A2 start storage pointer value of the identifier A2 control block CB2. In addition, the control microprocessor 24 sets the identifier A2 information area buffer at the start position of the transmission data. If no transmission request R1(j) is left in the transmission queue S1 upon removal of the transmission requests R1(j) from the transmission queue S1, or if no data frame D1(j) is linked to the transmission queue TQ2 at the timing of token reception, the control microprocessor 24 writes the address of the identifier A2 information area corresponding to the absence of a transmission request, as the identifier A2 storage pointer value of the identifier A2 control block CB2, in the identifier A2 start storage pointer value of the identifier A2 control block CB2.

With the above-described processing, the media access request frames F1 corresponding to the number of data frames D2 corresponding to the target token rotation timer residual value TRT1 are sent to the transmission path upon reception of the token.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of processing data in a transmission device for subsequent transmission of said data to at least one reception device, said transmission device being operatively interconnected to said at least one reception device, said method comprising the steps of:

generating and holding in said transmission device:
transfer time information indicative of a time required to transfer said data from said transmission device to said at least one reception device, and
reception timing information of said data corresponding to an amount of time required by said at least one reception device to process a data reception,
said transfer time information and said reception timing information being derived on the basis of timing information of previous communications operations between said transmission device and said at least one reception device;

arranging a group of transmission requests for a plurality of data in said transmission device, in response to a transmission request for data in said transmission device, on the basis of a difference between a request timing at which said data is required by said at least one reception device and a sum of:
1) said reception timing information, held in said transmission device,
2) said transfer timing information, held in said transmission device, and
3) a present time,
thereby determining a transmission sequence;

transmitting data from said transmission device to said at least one reception device in accordance with said determined transmission sequence; and transferring data which has been transmitted.

2. A method according to claim 1, further comprising the steps of:

causing said at least one reception device which has received data from said transmission device to subtract a timing from said request timing to obtain a timing difference and to arrange reception requests of said plurality of data in said at least one reception device on the basis of said timing difference, thereby determining a reception sequence and obtaining a determined reception sequence; and transferring said data to an application process at said at least one reception device on said basis of said determined reception sequence.

3. A method as in claim 1, further comprising:

generating and holding in said transmission device data transmission timing information corresponding to an amount of time required by said transmission device to process a data transmission, and wherein said step of arranging bases its arranging on a difference between the request timing at which the data is required by said at least one reception device and a sum of:
1) said reception timing information, held in said transmission device,
2) said transfer timing information, held in said transmission device,
3) a present time, and
4) said transmission timing information, held in said transmission device.

4. A method of transmitting data from a communication device to at least one reception device, and of receiving data from at least one transmitting device at said communication device, each of said communication device, said at least one transmitting device and said at least one reception device being operatively interconnected and each of said communication device, said at least one transmitting device and said at least one reception device being associated with at least one of a plurality of computers, said method comprising the steps of, on said communication device:

generating, by at least one of said computers, data transmission requests for associated data and providing said transmission requests to said communication device, said associated data being needed by other of said computers associated with said at least one reception device;

determining a transmission order in which said data associated with said transmission requests must be sent from said communication device so as to be received by said at least one reception device when needed by said other of said computers associated with said at least one reception device;

arranging said transmission requests according to said transmission order to obtain arranged transmission requests; and transmitting data associated with said transmission requests, in a sending order based on said arranged transmission requests, from said communication device to said at least one reception device;

determining a reception order in which data associated with reception requests received from said at least one transmission device must be processed by said communication device so as to be available when needed by said at least one of said computers associated with said communication device;

arranging said reception requests according to said reception order;

processing said reception requests in said reception order so that said at least one of said computers associated with said communication device receives data associated with said reception requests from said at least one transmission device.

5. A method according to claim 4, wherein each of said order determining steps includes the step of utilizing the time at which data is needed to determine said order.

6. A method according to claim 4, wherein each of said order determining steps includes the step of utilizing a period until data is needed to determine said order.

7. A method of transmitting data from one station in a plurality of stations to another station in said plurality of stations, said transmitting being in response to a a priority given to said data in said one station, said plurality of stations being operatively interconnected and each of said plurality of stations having an own communication device associated therewith, said method comprising the steps of:

comparing, in an own communication device associated with said one station, said priority of said data in said one station with a priority given to data in other stations of said plurality of stations; and transmitting said data in said one station when the priority of said data in said one station is higher than the priority of said data in said other stations.

8. A method according to claim 7, wherein said priority is determined based on an urgency of said data.

9. A method of transmitting data from one communication device of a plurality of communication devices arranged in a network, each of said devices having a first transmission queue, said method comprising the steps of:

causing each of said communication devices to transmit to said one communication device transmission requests associated with said first transmission queue of each of said communication devices, each first transmission queue being obtained by arranging transmission requests of a corresponding one of said communication devices in an order in which data associated with said transmission requests must be sent by said corresponding one of said communication devices so as to be received by other of said communication devices when needed;

forming a second transmission queue in said one communication device by accumulating transmission requests associated with said first transmission queues transmitted from said communication devices and arranging said accumulated transmission requests in an order in which data associated with said transmission requests must be sent by said corresponding of said communication devices so as to be received by said other of said communication devices when needed by said other of said communication devices; and comparing a transmission request associated with data to be sent next in the first transmission queue of said one communication device with said transmission requests accumulated in said second transmission queue in said one communication device, when said one communication device receives a token, and transmitting data associated with said transmission request, said data to be sent next according to said first transmission queue of said one communication device, to another communication device when said data associated with said transmission request must be sent before other data associated with a corresponding transmission request in said second transmission queue, said other data to be sent next according to said second transmission queue.

10. A data transmission method for transmitting data from one communication device of a plurality of operatively interconnected communication devices, each of said communication devices being associated with at least one of a plurality of computers, said method comprising the steps of:

on each of said communication devices, receiving, from at least one of said computers associated with said communication device, transmission requests to transmit data from said communication device to at least one other of said communication devices within a predetermined period of time, wherein each of said transmission requests includes transmission timing indicating said predetermined period of time; and forming a transmission queue of said transmission requests according to when data associated with said transmission requests must be sent by said communication device so as to be received by said at least one other of said communication devices when needed by computers associated with said at least one other of said communication devices, thereby determining a next transmission request to be processed by said communication device; and on said one communication device, comparing the transmission timing of said next transmission request of said one communication device with each of the transmission timings of next transmission requests of each other of said plurality of communication devices; and transmitting data associated with said next transmission request of said one communication device if it is determined on the basis of said comparing step that data associated with said next transmission request of said one communication device must be sent before data associated with each of said next transmission requests of said other communication devices.

11. A method according to claim 10, further comprising the steps of:

collecting reception requests received from at least one other of said communication devices by said one communication device in a reception queue;

organizing said reception requests for said one communication device in an order in which data associated with said reception requests must be processed so as to be available when needed by said at least one of said computers associated with said one communication device; and processing, in said one communication device, data associated with said reception requests in said order.

12. A communication device operatively interconnected with at least one other communication device, each of said communication devices being associated with at least one of a plurality of computers, said communication device comprising:

means for determining a sending order in which data associated with transmission requests made of said communication device by at least one of said computers associated with said communication device must be sent to said at least one other communication device so as to be received by said at least one other communication device when needed by said at least one of said computers associated with said at least one other communication devices;

means for arranging said transmission requests according to said sending order, and for transmitting data associated with said transmission requests as arranged;

means for determining a reception order in which data associated with reception requests received by said communication device must be processed so that said data is available when needed by said at least one of said computers associated with said communication device; and means for arranging said reception requests according to said reception order and for performing reception processing on said reception requests as arranged.

13. A device according to claim 12, wherein each of said determining means utilizes an absolute time at which data is needed to determine said order.

14. A device according to claim 12, wherein each of said determining means utilizes the time period until data is needed to determine said order.

15. A device for transmitting data from one station of a plurality of stations to another station in said plurality of stations in response to a priority given to said data in said one station, said plurality of stations being operatively interconnected and each of said plurality of stations having an own communication device associated therewith, said device comprising:

means, in an own communication device associated with said one station, for comparing said priority of said data in said one station with priorities given to data in others of said stations; and means for transmitting said data in said one station when the priority of said data in said one station is higher than the priorities of said data in each others of said stations.

16. A device according to claim 15, wherein said priority is determined based on an urgency of said data.

17. A device for transmitting data from one station of a plurality of stations to at least one other of said plurality of stations, said plurality of stations being operatively interconnected, each of said stations being associated with at least one of a plurality of computers, said device comprising:

transmission stack means for transmitting data from said one station to said at least one other of said stations and for receiving a plurality of transmission requests from at least one of said computers associated with said one station to transmit data from said one station to said at least one other of said stations, each of said transmission requests including time information indicating when data associated with the request is needed by said at least one of said computers associated with said at least one other of said stations;

means for forming a transmission queue in said transmission stack means in an order in which data associated with said transmission requests must be sent by said one station so as to be received by said at least one other of said stations when needed by said at least one of said computers associated with said at least one other of said stations;

means for providing each of said stations with the times associated with next transmission requests of each other of said stations;

comparison means for comparing the time associated with a next transmission request of said one station in said transmission queue with times associated with the next transmission requests of others of said stations; and means for transmitting data associated with said next transmission request of said one station when said comparison means determines that said next transmission request of said one station must be processed before each of said next transmission requests of said other stations.

18. A device according to claim 17, further comprising:

reception stack means, having a reception queue, for receiving reception requests from said other stations to process received data;

means for arranging said reception queue in an order in which data associated with said reception requests must be processed by said device so as to be available when needed by said at least one computer associated with said one station; and means for processing data associated with said reception requests as arranged by said arranging means.

19. A plurality of communication devices arranged in a network, each of said communication devices comprising:

timer means for measuring a present time common to said plurality of communication devices;

means for obtaining:
data transfer timing information indicative of a time taken to transfer data from a corresponding communication device to others of said plurality of communication devices, and data reception timing information of each of said other communication devices, corresponding to an amount of time required by said other devices to process a data transmission received from said corresponding communication device, said data transfer timing information and said data reception timing information being derived on the basis of timing information of past communication performed by said plurality of communication devices;

memory means for holding said obtained data transfer and data reception timing information;

transmission processing means for arranging a plurality of transmission requests in a transmission sequence, the transmission requests being associated with respective data to be transmitted by said corresponding communication device to others of said plurality of communications devices on the basis of timing differences, said timing differences determined by said transmission processing means by obtaining a sum of said reception processing and transfer timing information stored in said memory means and said present time obtained from said timer means and subtracting from said sum a request time at which data is required by said other communication devices; and transmission control means for passing a token between each of said communication devices and, when each one of said communication devices receives said token, for transferring specific data from said each one of said communication devices to others of said plurality of communication devices according to said transmission request sequence arranged by said transmission processing means.

20. A plurality of communication devices according to claim 19, wherein each of said communication devices further comprises:

means for receiving a plurality of data transmitted from said other communication devices, subtracting, for each of said data, another current time from another request time at which said communication device needs said data to obtain a difference therebetween, for determining a sequence of reception requests received from others of said communication devices, said reception requests to be processed by arranging reception processing requests of said plurality of data in accordance with said difference for each of said data, and for performing reception processing according to said determined reception processing sequence, each said reception request including timing information indicative of when data associated with said reception request is needed by the communication device.

21. A plurality of communication devices arranged in a network, each of said communication devices comprising:

means for forming a first transmission queue by arranging transmission requests of a corresponding one of said devices in an order in which data associated with said transmission requests must be sent by said corresponding device so as to be received by at least one other of said devices when needed by said at least one other of said devices;

means for transmitting said first transmission queue to others of said communication devices;

means for accumulating first transmission queues transmitted from said others of said communication devices, and for arranging said accumulated first transmission queues in an order in which data associated with said queues must be sent by said devices so as to be received by others of said devices when needed by said others of said devices, so as to form a second transmission queue; and means for comparing a next transmission request in said first transmission queue of said corresponding communication device with other transmission requests in said second transmission queue in said corresponding communication device when a token is received by said corresponding communication device, and for transferring data corresponding to said next transmission request when said next transmission request is also the transmission request to be processed next in said second transmission queue.

22. A plurality of communication devices arranged in a network, each communication device of said communication devices comprising:

timer means for measuring and for managing a current time common to said plurality of communication devices;

means for obtaining a data transfer timing information indicative of a time taken to transfer data from said communication device to others of said communication devices and data reception processing timing information indicative of a time each of said others of said communication devices takes to process received data on the basis of past communication from said communication device;

memory means for holding said obtained data transfer and data reception timing information;

transmission processing means for obtaining an arranged transmission request sequence from a plurality of transmission requests made to said communication device, said sequence obtained by subtracting, for each of said plurality of transmission requests, a sum of said data reception and said data transfer timing information stored in said memory means and a present time obtained by said timer means from a request timing at which data associated with each of said plurality of transmission requests is required by another of said communication devices to which said data is to be sent to obtain each difference, and arranging a transmission request sequence of a plurality of data to be transmitted on the basis of the differences;

means for obtaining transmission requests from all of said other communication devices;

means for forming a transmission queue by arranging said transmission requests of all of said other communication devices in an order in which data associated with said transmission requests must be sent so as to be received when needed; and means for passing a token between said communication devices, and, when having said token, for comparing a next transmission request in said arranged transmission request sequence of said communication device with said transmission queue, and, when said next transmission request of said communication device must be sent before a next transmission request in said transmission queue, transferring data corresponding to said next transmission request of said communication device.

23. A plurality of communication devices according to claim 22, wherein each of said communication devices further comprises means for receiving a plurality of data transmitted from said other communication devices, subtracting, for each of said data, another current time from another request time at which said communication device needs said data to obtain a difference therebetween, for determining a sequence of reception requests received from others of said communication devices, said reception requests to be processed by arranging reception processing requests of said plurality of data in accordance with said difference for each of said data, and for performing reception processing according to said determined reception processing sequence, each said reception request including timing information indicative of when data associated with said reception request is needed by the communication device.

24. A method of transmitting data from a transmission device to at least one reception device, said transmission device and said at least one reception device being operatively interconnected and each of said transmission device and said at least one reception device being associated with at least one of a plurality of computers, said method comprising the steps of, using said transmission device:

generating by at least one of said computers data transmission requests for associated transmission data and providing said transmission requests to said transmission device, said associated transmission data including data needed by other of said computers associated with said at least one reception device;

determining an order in which said transmission requests must be processed by said transmission device so that data associated with said transmission requests will be available at said at least one reception device when needed by said other of said computers associated with said at least one reception device;

rearranging said transmission requests according to said order determined by said determining step; and processing said transmission requests as rearranged in said rearranging step to transmit data associated with said transmission requests from said transmission device to said at least one reception device.

25. A method according to claim 24, wherein said order determining step includes the step of utilizing the times at which data is needed to determine said order.

26. A method according to claim 24, wherein said order determining step includes the step of utilizing a length of a time period from a present time until said data is needed to determine said order.

27. A method of receiving data at a reception device from at least one transmission device operatively interconnected to said reception device, each of said at least one transmission device and said reception device being associated with at least one of a plurality of computers, said method comprising the steps of, using said reception device:

determining an order in which reception requests received from said at least one transmission device must be processed by said reception device so that data associated with said reception requests will be available when needed by at least one of said computers associated with said reception device;

rearranging said reception requests according to said order determined by said determining step; and processing said reception requests as rearranged in said rearranging step so that said at least one of said computers associated with said reception device receives data associated with said reception requests.

28. A method according to claim 27, wherein said order determining step includes said step of utilizing times at which data is needed to determine said order.

29. A method according to claim 27, wherein said order determining step includes the step of utilizing a length of a time period from a present time until said data is needed to determine said order.

30. A data transmission device operatively interconnected with at least one data reception device, each of said data transmission device and said at least one data reception device being associated with at least one of a plurality of computers, wherein said plurality of computers associated with said data transmission device make data transmission requests of said data transmission device, each of said data transmission requests having data associated therewith, said data transmission device comprising:

memory means for holding data transmission information associated with each of said data transmission requests, said data transmission information including timing information regarding when said data associated with said corresponding transmission request is needed by at least one of said computers associated with said at least one data reception device;

means, connected to said memory means, for determining, based on said timing information, a processing order in which said transmission requests in said memory means must be processed; and means for arranging said data transmission requests in said memory means according to said processing order, for determining a processing sequence in which to process said transmission requests, based on said arranged data transmission requests, and for transmitting data associated with said transmission requests.

31. A device according to claim 30, wherein said determining means utilizes a time at which data is needed by a requesting communication device to determine said processing order.

32. A device according to claim 30, wherein said determining means utilizes a length of a time period for a preset time until data is needed by a requesting communication device to determine said processing order.

33. A data reception device operatively interconnected with at least one data transmission device, each of said data transmission device and said at least one data reception device being associated with at least one of a plurality of computers, said data reception device comprising:

memory means for holding data reception information associated with a plurality of data reception requests received by said data reception device from said at least one transmission device, said reception information including timing information regarding when data associated with said plurality of data reception requests in said memory means must be processed by said data reception device so as to be available when needed by at least one of said computers associated with said data reception device;

means, connected to said memory means, for determining a processing order of said reception requests based on said timing information; and means for arranging said data reception requests in said memory means according to said processing order, for determining a processing sequence in which to process said reception requests, based on said arranged data reception requests, and for receiving data associated with said reception requests.

34. A device according to claim 33, wherein said determining means utilizes a time at which data is needed by a requesting communication device to determine said processing order.

35. A device according to claim 33, wherein said determining means utilizes a length of a time period for a preset time until data is needed by a requesting communication device to determine said processing order.

* * * * *